US010140125B1

(12) United States Patent

Bhasin et al.

(10) Patent No.: US 10,140,125 B1

(45) Date of Patent: Nov. 27, 2018

(54) METHODS AND APPARATUS FOR INTERACTIVE CONTENT INJECTION

(75) Inventors: Parvinder S. Bhasin, Hayward, CA (US); Gagandeep B. Singh, Fremont, CA (US); Ravinder S. Virk, Rodeo, CA (US)

(73) Assignee: RaGaPa, Inc., Sunnyvale, CA (US)

( * ) Notice: Subject to any disclaimer, the term of this patent is extended or adjusted under 35 U.S.C. 154(b) by 138 days.

(21) Appl. No.: 13/589,998

(22) Filed: Aug. 20, 2012

Related U.S. Application Data

(60) Provisional application No. 61/526,483, filed on Aug. 23, 2011.

(51) Int. Cl.
*G06F 15/16* (2006.01)
*G06F 9/32* (2018.01)

(52) U.S. Cl.
CPC .................................... *G06F 9/32* (2013.01)

(58) Field of Classification Search
CPC .................................................... H04L 69/329
USPC ........................................................ 709/226
See application file for complete search history.

(56) References Cited

U.S. PATENT DOCUMENTS

2004/0078489 A1* 4/2004 Anderson et al. ............ 709/245
2007/0038641 A1* 2/2007 Fawcett ............ G06F 17/30899
2007/0067495 A1* 3/2007 Levy ............................ 709/246
2007/0088801 A1* 4/2007 Levkovitz et al. ........... 709/217
2007/0234416 A1* 10/2007 Matsuoka et al. .............. 726/12
2007/0244750 A1* 10/2007 Grannan et al. ................ 705/14
2008/0040225 A1* 2/2008 Roker ............................ 705/14
2008/0140728 A1* 6/2008 Fraser ............... G06F 17/30905
2010/0281401 A1* 11/2010 Tebbs ...................... G06F 19/00 715/760
2011/0167156 A1* 7/2011 Mani et al. .................. 709/224
2012/0116883 A1* 5/2012 Asam et al. ............... 705/14.58
2012/0158502 A1* 6/2012 Chung et al. ............. 705/14.53
2012/0324551 A1* 12/2012 Bretschneider et al. ......... 726/5
2013/0041761 A1* 2/2013 Voda .......................... 705/14.68
2013/0268840 A1* 10/2013 Skirpa .......................... 715/234

OTHER PUBLICATIONS

WO 98/45793.*

(Continued)

*Primary Examiner* — Bryan Lee
*Assistant Examiner* — Oluwatosin Gidado
(74) *Attorney, Agent, or Firm* — Nicholson De Vos Webster & Elliott LLP

(57) ABSTRACT

A method in a network device acting as a gateway of a venue for providing interactive content to a client device. The network device receives a first request from the client device for a webpage accessible through a data network, transmits a second request for the webpage, and receives the webpage. The network device determines whether the webpage is eligible for modification. Responsive to determining that the webpage is eligible for modification, the network device retrieves, from a central system, content to be injected into the webpage that includes a script to be executed by a web browser of the client device that causes the web browser to display the interactive content, modifies the webpage to yield a modified webpage that includes the content, and transmits, to the client device, the modified webpage, whereby the modified webpage is displayed by the web browser with the interactive content.

24 Claims, 14 Drawing Sheets

(56) References Cited

OTHER PUBLICATIONS

IEEE Std 802.11u—2011, "Part 11: Wireless LAN Medium Access Control (MAC) and Physical Layer (PHY) Specifications, Amendment 9: Interworking with External Networks," dated Feb. 25, 2011, 208 pages.

* cited by examiner

METHODS AND APPARATUS FOR INTERACTIVE CONTENT INJECTION

CROSS-REFERENCE TO RELATED APPLICATIONS

This application claims benefit of U.S. Provisional Application No. 61/526,483, filed Aug. 23, 2011, which is hereby incorporated by reference.

FIELD OF THE INVENTION

This invention relates in general to the field of computer networks and electronic systems, and more particularly to a method, apparatus, and system for interactive content injection.

BACKGROUND

The emergence of the Internet and the World Wide Web ("the web") has significantly changed the way people communicate, locate information, purchase goods and services, and even entertain themselves. As a result, this transition into a digital economy has significantly impacted the traditional "brick and mortar" economy: bookstores, music stores, and even department stores have seen declines in business due to increased competition with online merchants. In addition to creating websites to sell physical goods, companies also use the Internet to sell intangible products such as digital news stories and books, stock price information, streaming media, and even virtual currencies to be used in online games.

The utility of and reliance upon the Internet has only grown with the recent development and popularity of smartphones and tablet computers. These mobile/portable devices allow users to access the Internet from wherever they are located, such as on a bus or at a sporting event, instead of only accessing the Internet from a PC at a desk. People with mobile devices are now able to chat with friends, send email, book restaurant reservations, and find nearby parking spaces wherever and whenever they desire.

With more and more people using the Internet from more and more places, the world of online advertising has also become more important. However, the general approach to online advertising has remained stagnant. "Banner advertisements" are often placed on webpages to attempt to lure users to purchase related goods and services, and unsolicited email messages ("SPAM" messages) are sent through email. However, both of these approaches are typically impersonal; no matter whom you are, where you are, or what you are looking for, you may be shown the same advertisement as any other person. When advertisements are not relevant to the user or the user's browsing objective, an opportunity is wasted to potentially match a willing customer with a willing vendor.

Additionally, many small organizations wish to advertise on the Internet but do not have a large budget. For these groups, then, it is extremely important to target online advertising to only potential customers in order to maximize each advertising dollar spent; displaying an advertisement to a user in Wisconsin for a small café in California is useless because that user has no or little interest in such an advertisement.

Further, much online advertising is tied to search engines. When a user enters a particular set of keywords into a search engine, the engine may attempt to match the entered keywords with one or more relevant advertisements. While this has proven somewhat successful, the advertising is inherently tied to the search engine; once a user navigates away from the search engine's result pages, the search engine can no longer provide advertising services.

Thus, there exists a need to provide new and improved systems and methods to facilitate the dynamic display of personalized and local advertising and marketing content. Further, these systems and methods must allow effective and efficient deployment of advertising without requiring fundamental changes to the Internet, World Wide Web, or Internet-enabled devices. Additionally, these systems and methods should not be rigidly tied to a particular website.

SUMMARY

Methods and apparatus for providing interactive content to client devices are described. According to one embodiment of the invention, a method is performed by a network device acting as a gateway for a venue and communicatively coupled between a client device and a data network. The network device receives a first request from the client device for a webpage accessible through the data network. The request includes a Uniform Resource Identifier (URI) of the webpage. The network device transmits, over the data network, a second request for the webpage using the URI. The network device receives the webpage, and determines whether the webpage is eligible for modification. Responsive to determining that the webpage is eligible for modification, the network device retrieves content, from a central system, to be injected into the webpage. The content includes a script to be executed by a web browser of the client device that causes the web browser to display the interactive content. Further responsive to determining that the webpage is eligible for modification, the network device modifies the webpage to yield a modified webpage that includes the content, and transmits the modified webpage to the client device. The modified webpage is displayed to by the web browser with the interactive content.

According to an embodiment of the invention, a network device is to act as a gateway of a venue and is to be communicatively coupled between a set of one or more client devices and a data network and provide interactive content to the set of client devices. The network device includes a network adapter and a content modification module that is coupled to the network adapter. The network adapter is configured to receive a first set of one or more requests from the set of client devices for one or more webpages, transmit a second set of one or more requests for the one or more webpages, and receive the one or more webpages through the data network. The content modification module is configured to determine whether the each of the one or more webpages is eligible for modification. The content modification module is also configured to, for each of the one or more webpages that are determined eligible for modification, retrieve from a central system content to be injected into the webpage. The content includes a script to be executed by a web browser of the respective client device that causes the web browser to display the interactive content. The content modification module is also configured to, for each of the one or more webpages that are determined eligible for modification, modify the webpage to yield a modified webpage that includes the content, and cause the network adapter to transmit each modified webpage to the respective client device that requested the respective webpage.

In an embodiment of the invention, a non-transitory computer-readable storage medium stores instructions that, when executed by a network device acting as a gateway for a venue and that is communicatively coupled between a client device and a data network, cause the network device to provide interactive content to the client device by performing operations. The operations include receiving, at the network device, a first request from the client device for a webpage accessible through the data network. The first request includes a Uniform Resource Identifier (URI) of the webpage. The operations further include transmitting, by the network device over the data network, a second request for the webpage using the URI, and also receiving, by the network device, the webpage. The operations further include determining whether the webpage is eligible for modification, and, responsive to determining that the webpage is eligible for modification, retrieving, from a central system, content to be injected into the webpage. The content includes a script to be executed by a web browser of the client device that causes the web browser to display the interactive content. Responsive to determining that the webpage is eligible for modification, the operations also include modifying the webpage to yield a modified webpage that includes the content, and transmitting, to the client device, the modified webpage, whereby the modified webpage is displayed by the web browser with the interactive content.

BRIEF DESCRIPTION OF THE DRAWINGS

The present disclosure will be understood more fully from the detailed description that follows and from the accompanying drawings, which however, should not be taken to limit the disclosed subject matter to the specific embodiments shown, but are for explanation and understanding only. In the drawings.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims. References in this specification to "an embodiment," "one embodiment," or the like, mean that the particular feature, structure or characteristic being described is included in at least one embodiment of the present invention. However, occurrences of such phrases in this specification do not necessarily all refer to the same embodiment.

The terms "URI" (Uniform Resource Identifier) and "URL" (Uniform Resource Locator) are used herein to generally refer to either a URI or a URL. Commonly, a URI identifies a particular resource while a URL both identifies a resource and indicates how to locate it. Thus, all URLs are URIs because they identify a resource, but not all URIs are URLs because they do not all indicate how to locate the resource. Historically, the terms have been almost synonymous as almost all URIs have also been URLs.

Additionally, the terms "client" and "user" are used interchangeably except when the term's context suggests otherwise. Both terms may be used to identify a person requesting a particular resource from a network, such as a webpage from the Internet. Both terms may also be used to identify a particular device used by a person requesting a particular resource from a network.

Figure 1:
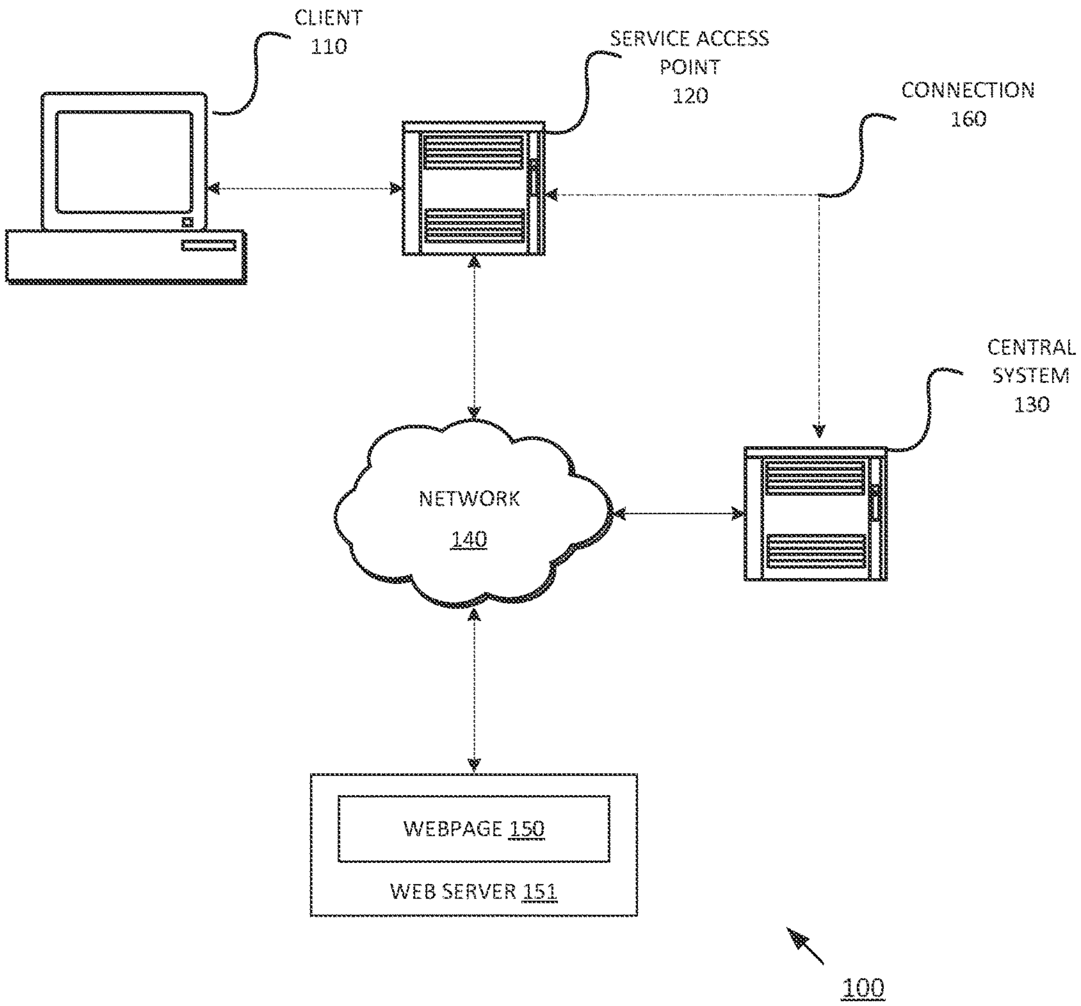
FIG. 1 illustrates one embodiment of a network environment in which the invention may be implemented.
Figure 15:
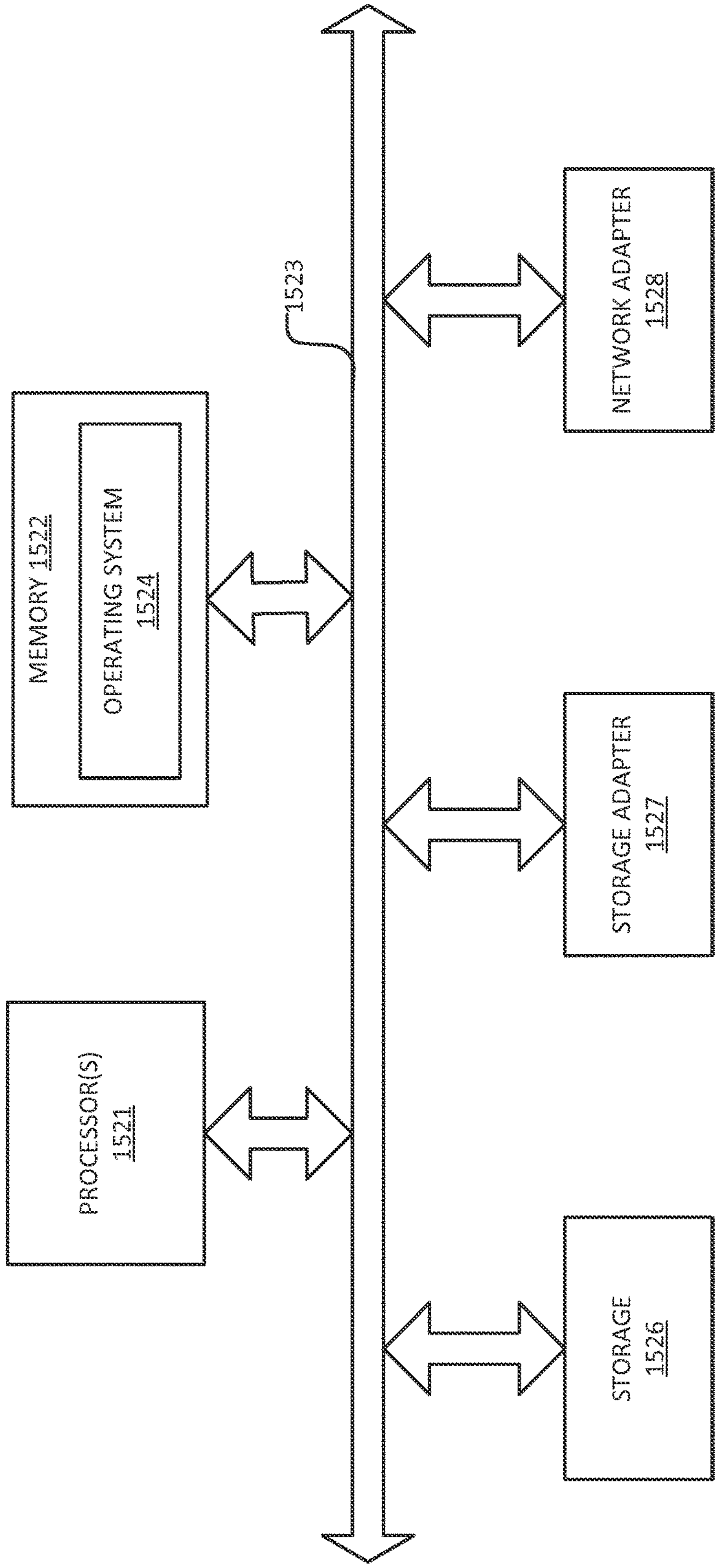
FIG. 15 is a high-level block diagram showing an example of the hardware architecture of a processing system.

FIG. 1 illustrates one embodiment of a network environment 100 in which the invention may be implemented. This embodiment 100 is deemed a "device model," as a client 110 connects directly to a service access point device 120 for networking and internet surfing capabilities. While FIG. 1 illustrates only one client 110, it may be appreciated that this embodiment may also support a plurality of clients, simultaneous or not. The one or more clients 110 may comprise processing systems as depicted in FIG. 15 and may include traditional computers, laptops, netbooks, web enabled phones, tablets, or any other networking enabled devices. Each client 110 connects to the service access point device using either wired or wireless networking capabilities.

In the embodiment illustrated in FIG. 1, the service access point device 120 comprises a processing system as depicted in FIG. 15 and is installed in such a manner as to allow one or more clients 110 to directly connect to it. This installation location may be in many possible public or private places, both indoor and outdoor, including but not limited to a café, restaurant, library, gas station, casino, hotel, park, sporting event, building, vehicle, roadway, or any other location allowing for the installation of the service access point device 120. This installation location is deemed to be a "venue."

A client 110 issues a request for a resource located on a network 140 (e.g., Internet, Wide Area Network (WAN), Local Area Network (LAN), etc.), such as a webpage 150 provided by web server 151. This webpage 150 may comprise one or more retrievable files or portions of files used to display content within a web browser, such as HyperText Markup Language (HTML), Cascading Style Sheets (CSS), JavaScript, or image files. Similarly, the webpage 150 may comprise any other piece of retrievable data including but not limited to an email message, text file, multimedia file, data stream, DOM object, JSON data, XML, etc. The service access point device 120 then retrieves the webpage 150. The web server 151 is typically a computer application that provides web content while executing on one or more computer processing devices such as the processing device disclosed in FIG. 15. Examples of computer applications providing web server 151 functionality include, but are not limited to, Apache HTTP Server by the Apache Software Foundation, Internet Information Services (IIS) by Microsoft Corporation, nginx by NGINX, Inc., and Google Web Server (GWS) by Google Inc. Of course, other computer applications may provide the web server 151 functionality.

Through a network 140 or direct wired or wireless connection 160, the service access point device 120 connects to a Central System 130 to retrieve content to be injected into the webpage 150. This Central System 130 comprises a processing system as depicted in FIG. 15. In an alternative embodiment, the Central System 130 is a part of the service access point device 120 itself, either as a software module or separate process. The service access point device 120 then injects the content into the retrieved webpage 150 to create a modified webpage, which is then returned to the client 110.

Figure 2:
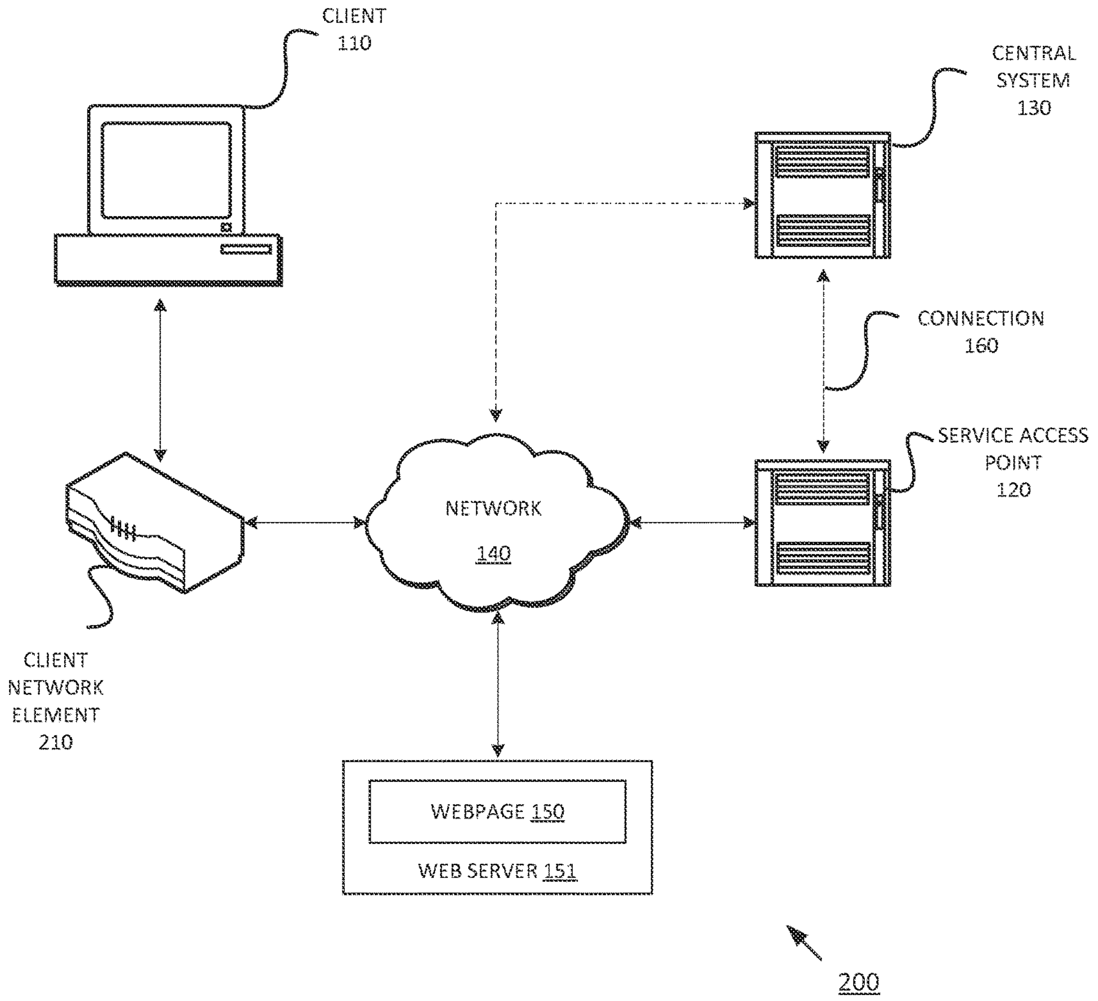
FIG. 2 illustrates another embodiment of a network environment in which the invention may be implemented.

FIG. 2 illustrates another embodiment of a network environment 200 in which the invention may be implemented. This embodiment 200 is deemed a "cloud model." In this cloud model 200, the service access point device 120 does not need to be installed at the venue's physical location. Instead, the venue's own networking equipment 210, e.g. an edge router connected to the network 140, will redirect traffic to services in the cloud provided by a service access point device 120, which is also connected to the network 140. This redirection may be effected through a variety of well-known means, including but not limited to the use of IP Sec tunnels, proxy chaining, etc. The service access point device 120 will fetch the requested webpage 150 from a web server 151, fetch relevant content from the central system 130 either through the network 140 or directly through a wired or wireless connection 160, merge the two by injecting the content into the webpage 150 to create a modified webpage, and send the modified webpage back to the requesting venue's networking equipment 210 to be returned to the client 110. As long the venue's clients 110 are connected to the network 140 through networking equipment 210 such as edge routers with redirects, the modification of the webpage 150 via content injection will remain transparent to the clients.

In this "cloud model" embodiment illustrated by FIG. 2, a client 110 does not have to be present on venue premises to use the service provided by the service access point device 120. Clients can connect to the service access point device 120 from anywhere where Internet access is present. A client 110 may simply modify their device to send requests for network-accessible resources (such as a webpage 150 provided by web server 151) to the service access point device 120. This can be accomplished in a number of ways, including but not limited to modifying the client's 110 browser proxy settings to use the networking address (e.g., URI) of the service access point device 120 as a proxy server.

Figure 3:
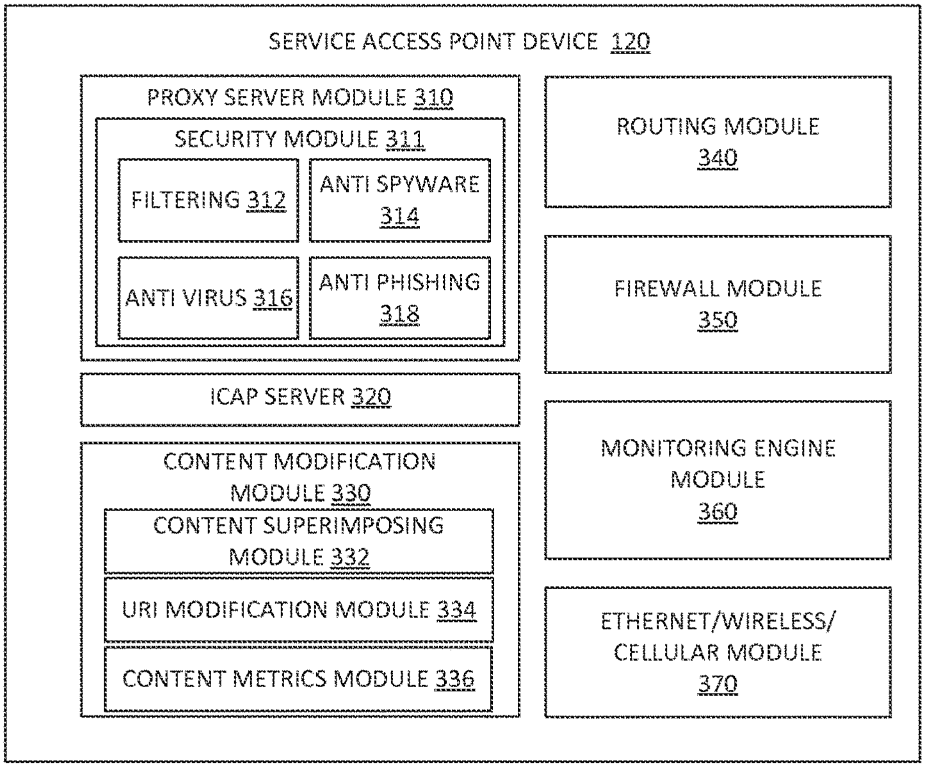
FIG. 3 is a high-level block diagram illustrating the components within a service access point device used to implement one embodiment of the invention.

FIG. 3 is a high-level block diagram illustrating the components within a service access point device 120 used to implement one embodiment of the invention. The service access point device 120 comprises many individual components that communicate with each other to perform user authentication, authorization, routing, webpage retrieval, content retrieval, and transmission of the modified page back to the client 110.

One portion of the service access point device 120 illustrated in FIG. 3 is a proxy server module 310. The proxy server module 310, in conjunction with ICAP server 320, maintains the responsibility to authenticate and authorize clients as well as fetch and cache a client's 110 requested webpage 150. In one embodiment of the invention, authentication occurs by checking for a client's 110 MAC address against an internal map of authenticated MAC addresses or through a login page.

In one embodiment, the proxy server module 310 includes a security module 311. This security module 311 includes one or more sub-modules related to the security of the system, injectable content, and retrieved request data.

In one embodiment, the security module 311 includes a filtering module 312, which filters client 110 resource requests, thus preventing the request from being returned to the client 110. In one embodiment, this filtering occurs based upon a requested URI or IP pattern.

In an embodiment, the security module 311 includes an anti-spyware module 314, which examines the requested webpage 150 for spyware and performs one or more actions if spyware is found. Examples of such actions include notifying the client 110 that the requested resource appears to contain spyware, recording the webpage as containing spyware, attempting to remove the spyware from the requested webpage 150, or simply refusing to return the requested webpage 150 to the client 110. Additionally, in some embodiments, the spyware module 314 queries an internal database or external service to determine if the requested webpage 150 is known to contain spyware.

In an embodiment, the security module 311 also includes an anti-virus module 316, which scans the requested webpage 150 for viruses and performs one or more actions based upon the result of the scan. For example, if a virus is detected, the anti-virus module 316 will try to remove or neutralize the virus, record the webpage as containing a virus, and/or refuse to return the requested webpage 150 to the client 110. Additionally, in an embodiment the anti-virus module 316 queries an internal database or external service to determine if the requested webpage 150 is known to contain a virus.

In an embodiment, the security module 311 also includes an anti-phishing module 318, which monitors each requested webpage 150, and if the URI is known to be a phishing site (i.e. a website that spoofs, or pretends to be, a known website or hosts malicious content) then the request is blocked. In an embodiment, the anti-phishing module 318 uses a database (local or remote) to determine if the requested webpage 150 is a phishing site; in other embodiments, the anti-phishing module 318 queries an external service to make this determination. In some embodiments the anti-phishing module 318 will use a database and make a query to an external service to determine if a requested webpage 150 is a phishing site. Additionally, in some embodiments, the anti-phishing module 318 updates a local or remote database with a record of detected phishing sites.

Authorization occurs by determining whether a client's 110 requested webpage is allowed to be retrieved. To make this determination, a venue creates requirements limiting what types of data may be retrieved and thereby creates a set of rules to enforce these requirements. Some examples of resource requests that may not be authorized by a venue might include webpages involving adult content, peer-to-peer file sharing data (e.g., torrents, etc.), audio-visual streams, and malicious files.

If the client 110 is authenticated and authorized then the proxy server module 310 may modify the requested webpage's 150 URI using the URI modification module 334. In one embodiment, the URI modification module 334 inserts a partner/affiliate identifier into the URI to designate to the server hosting the requested webpage 150 that the request was generated by the service access point device 120, venue, or system. Additionally, in some embodiments, the URI modification module 334 inserts location data into the requested URI to provide additional information to the server hosting the requested webpage 150 about the physical geolocation of the client 110.

The proxy server module 310 fetches the requested webpage 150 from a web server 151 over the network 140 (e.g. Internet). In addition, through the content modification module 330, the service access point device 120 fetches relevant content to be injected into the requested webpage 150 from the Central System 130 based on the venue's policies, the client's web usage profile, the requested webpage's keywords and the geolocation of the client or venue. At this point, the service access point device 120, through the content superimposing module 332, will employ an Internet Content Adaptation Protocol (ICAP) server 320 to analyze the fetched webpage 150 and inject the content into the page. In one embodiment, the ICAP server executes as part of the service access point device 120 itself, which is illustrated in FIG. 3. In another embodiment, the ICAP server executes on the Central System 130; in yet another embodiment, the ICAP server executes on a completely different server accessible by the service access point device 120 or Central System 130 through the network 140 or a direct connection.

The Content Metrics Module 336 is used to keep statistics regarding content injection activity, request activity, user activity, or other system activities. In one embodiment, the Content Metrics Module 336 keeps track of how many times each particular piece of content is injected. In another embodiment, the Content Metrics Module 336 records how many clicks (or user inputs/interactions) occurred with a particular piece of injected content. In another embodiment, the Content Metrics Module 336 records what web browser the client 110 used for each request. This stored data may be used to profile users, implement artificial intelligence, perform content analysis, or generate accounting information or reports.

The service access point device 120 has the capability of routing network traffic and managing all clients 110 that are connected to the device using a routing module 340. This routing module 340 will maintain each client's state and deliver the information as requested by each client 110.

The service access point device also provides the functionality of a firewall with a firewall module 350. This module will make sure that only authorized connections are made between clients 110 and the network 140 through the service access point device 120. The firewall module will also make sure only connections between authorized internet protocol addresses (IPs) and ports are allowed.

The service access point device's 120 monitoring engine 360 collects vital system information and transmits that information back to Central System 130. In one embodiment, this transmission is on an ongoing periodic basis, but it may also be executed on demand. This information includes but is not limited to various system internal statistics regarding the service access point device 120, such as CPU usage, memory usage, disk usage, network activity, etc. In embodiments of the invention, the service access point device 120 is maintained and administered remotely via VPN.

The service access point device 120 also has the capability to connect with clients 110, the network 140, and other servers (including but not limited to the Central System 130) using various networking technologies and protocols 370, including but not limited to Ethernet, wireless, and cellular. In one embodiment, the Ethernet-capable device has at least two Ethernet ports and the wireless capable device has a wireless access point that can both send and receive network traffic. In an embodiment, the service access point device 120 is also able to communicate over cellular/wireless network technology standards such as 3G, 4G, LTE (i.e. 3GPP Long Term Evolution), etc.

The content modification module 330 is responsible for modifying a client's 110 requested webpage 150 to include injected content. In one embodiment, this content is a promotional message such as an advertisement or notification. This content can be in any format including image, video, text, audio or voice carried in a digital format. The content modification module 330 queries a content server such as an ad server (which, in one embodiment, is a part of the Central System 130), and passes in the user, device information and geolocation to fetch relevant content. The content superimposing module 332 then performs the content injection through the ICAP server 320, which modifies the fetched webpage to embed the relevant content. The modified webpage is then returned to the client 110 and rendered an output by the client browser. In one embodiment, the client browser will display injected content superimposed on top of the requested webpage 150.

Figure 4:
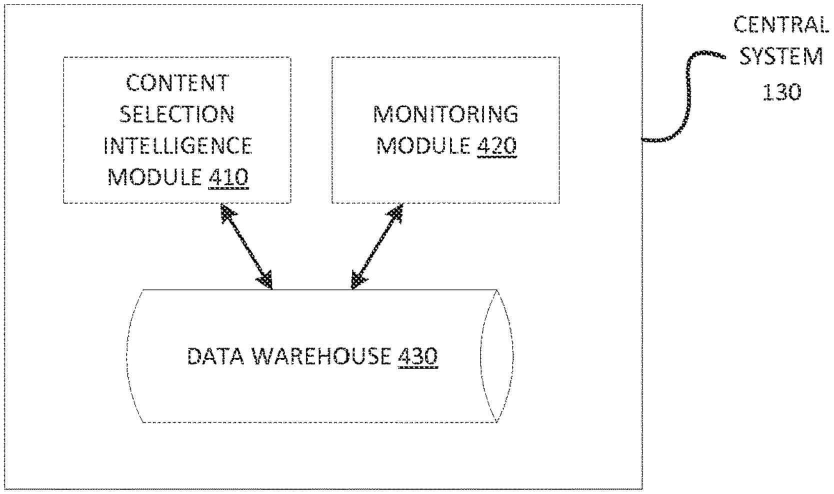
FIG. 4 illustrates a high-level view of a central system used to implement one embodiment of the invention.

FIG. 4 illustrates a high-level view of a central system 130 used to implement one embodiment of the invention. In one embodiment, the central system 130 includes a Content Selection Intelligence Module 410, Monitoring Module 420, and a Data Warehouse 430. In one embodiment, the central system 130 resides on a server attached to the Internet. In other embodiments, the central system 130 is coupled to a service access point device 120 or run on the same hardware as the service access point device 120.

The Content Selection Intelligence Module 410 selects what content should be displayed to client 110. In one embodiment, the content is selected based upon the client's usage profile, currently requested webpage, and current geolocation indicating where the request came from. Each client's requests are stored and analyzed over time to determine the client's interests and hobbies, or what the client might have be searching and browsing recently. The Content Selection Intelligence Module 410 uses a unique identifier that identifies each client 110 and client's profile. This identifier is passed in to Content Selection Intelligence Module 410 by the content requesting device via the service access point device 120. Similarly, in embodiments of the invention, a unique identifier that identifies the requesting device is also passed in. These identifiers, along with the request IP address, allow the user to be geolocated. Using the current request page, user profile and geolocation, the Content Selection Intelligence Module 410 determines the most relevant content to be inserted into the webpage, which will then be returned to requesting device.

The monitoring module 420 is part of the invention's overall system monitoring scheme. In embodiments of the invention, each service access point device 120 is configured to periodically update and transmit metrics to the central system 130 monitoring module 420. In various embodiments, these service access point device 120 metrics include a CPU utilization history, memory statistics or utilization, or disk and network usage. In an embodiment, these updates are sent over the network 140 (e.g. Internet), and in other embodiments the updates are sent through a Virtual Private Network (VPN) connection. The monitoring module 420 then records, analyzes and sends notifications to system administrators if something abnormal is detected. If a service access point device 120 does not update metrics for an extended period of time, notifications are sent by the monitoring module 420 to system administrators to alert them about a potential problem with the service access point device 120. Then, an administrator may administer or maintain the service access point devices 120 remotely via VPN or directly at the physical location of a service access point device 120.

According to embodiments of the invention, the central system 130 also includes a data warehouse 430. The data warehouse 430 stores all information regarding users, administrators, devices, locations, and user surfing histories. In certain embodiments, the data warehouse 430 also stores all content to be injected as well as metadata regarding the content to be injected. In systems where advertisements are the injected content, part of the data warehouse acts as an ad warehouse. Additionally, all requests for relevant content, client authentication, and authorization may be processed through this warehouse.

Figure 5:
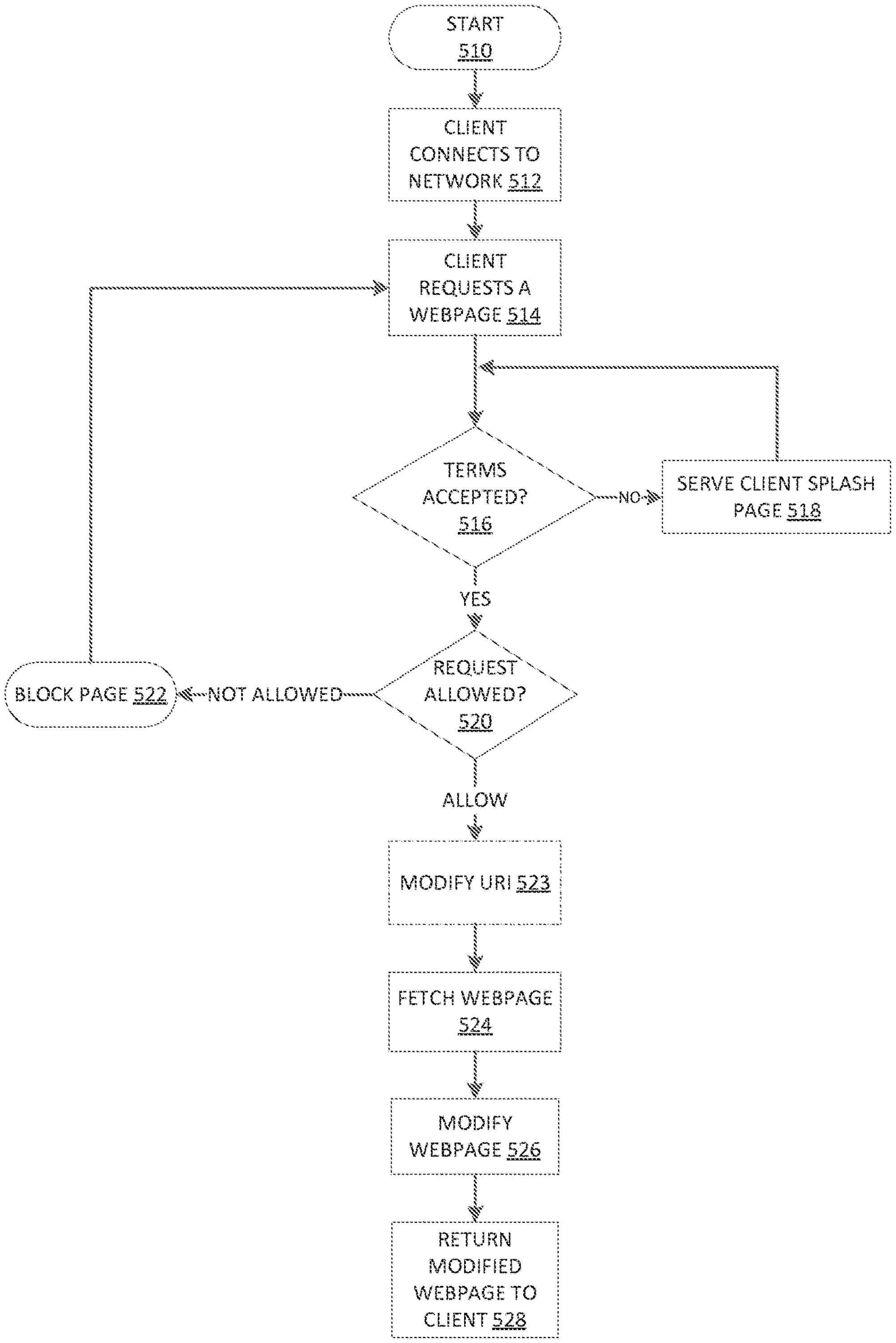
FIG. 5 is a flow diagram illustrating user interaction with one embodiment of the invention.

FIG. 5 is a flow diagram illustrating client interaction with one embodiment of the invention. This flow diagram includes steps representing the actions occurring from initial connection to acceptance of terms of service (TOS) to creating a new account to finally receiving the requested webpage. Starting 510 with a user and device, a client 110 will first connect to a network 512. In one embodiment, this connection involves the client connecting directly to a service access point device 120 (i.e. the "device" model presented in FIG. 1). In another embodiment, this connection involves the client 110 connecting through other network equipment 210 (i.e. the "cloud" model presented in FIG. 2). At this point, a client 110 with a network device (including, but not limited to a laptop, netbook, smartphone, tablet or any other network enabled device) connects to the network and successfully is assigned an internet protocol address through an IP lease. After a successful connection, the client requests a network resource such as a webpage 514 on the device, perhaps using a web browser. Next, using session information, the system will check to see if the client 110 has a valid session by determining if the client 110 has already accepted the Terms of Service ("TOS") 516. In one embodiment, the session is tracked using the unique MAC address of the client's device. If the client 110 has not already accepted the TOS, then a splash page with the TOS is shown 518, and until the client 110 has accepted the TOS any further request will cause the system to continually display this same page. Once the client 110 successfully accepts the TOS, the webpage request is intercepted by the security module 520. If the security module determines the request may not be allowed, the page is blocked 522 and the request is aborted. If the security module determines the request is allowed, the request URI may be modified 523 using the URI modification module 334. Then, the webpage will be fetched 524, modified 526, and returned to the client 528.

Figure 6:
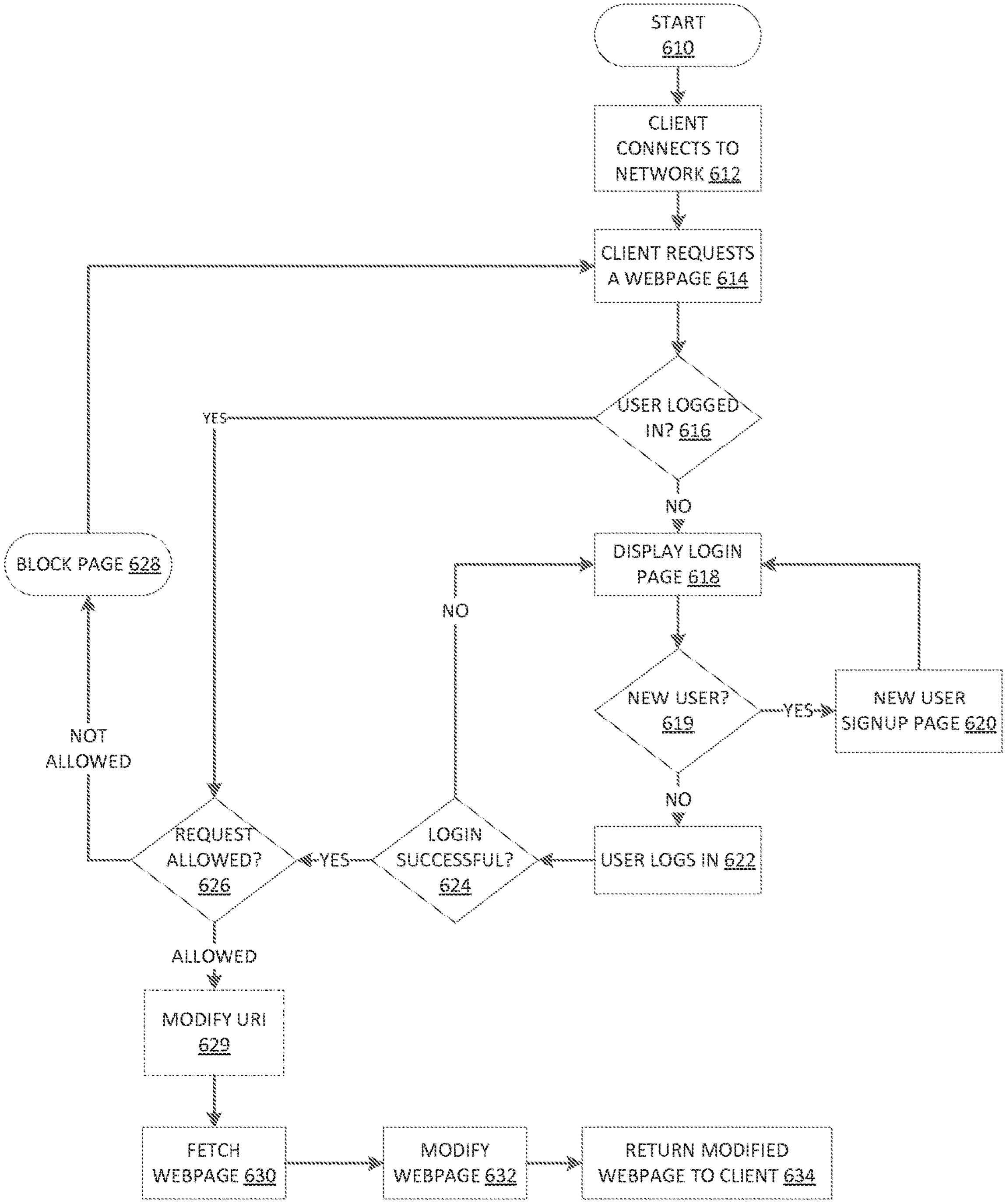
FIG. 6 is a flow diagram illustrating user interaction with one embodiment of the invention, including a login process.

FIG. 6 is a flow diagram illustrating client interaction with one embodiment of the invention, including a login process. This figure includes the steps from initial client connection to login to creating a new account to finally seeing the modified webpage requested. Starting 610 with a client 110 and device, the client 110 will first connect to a network 612. In one embodiment, this connection involves the client 110 connecting directly to a service access point device 120 (i.e. the "device" model presented in FIG. 1). In another embodiment, this connection involves the client 110 connecting through other network equipment 210 (i.e. the "cloud" model presented in FIG. 2). At this point, a client 110 with a network device (including, but not limited to a PC, laptop, netbook, smartphone, tablet or any other network enabled device) connects to the network and successfully is assigned an internet protocol address through an IP lease. After a successful connection, the client 110 requests a webpage 614 on the device, perhaps using a web browser. Using session information, the system determines if the client 110 is already logged in 616 with a user account. In one embodiment, the session is tracked with a username and password based session. If the client 110 is not logged in, he is directed to the login page 618, otherwise the webpage request is intercepted by the security module 626. If the client 110 is not logged in and doesn't have a valid login session, he is directed to a login page 618 where login information is shown. At this time 619, a client 110 has either already created an account with the system and thereby has login information, or the client 110 is a new first time user. If the client 110 already has an account he signs in 622 and with a successful login 624 his request is intercepted by the security module 626, otherwise he is again presented with a login page 618. On the other hand, if a new, first-time user is present he will be directed to the sign-up page 620 where he opens a new account. Once he is done with opening a new account he is directed back to the login page 618. After a client successfully logs in 624 under a user account, the user's request is intercepted by the security module 626. If the security module determines the request is not allowed, the page is blocked 628 and the request is aborted. If the security module determines the request is allowed, the request URI may be modified 629 using the URI modification module 334. Then, the webpage will be fetched 630, modified 632, and returned to the client 634.

Figure 7:
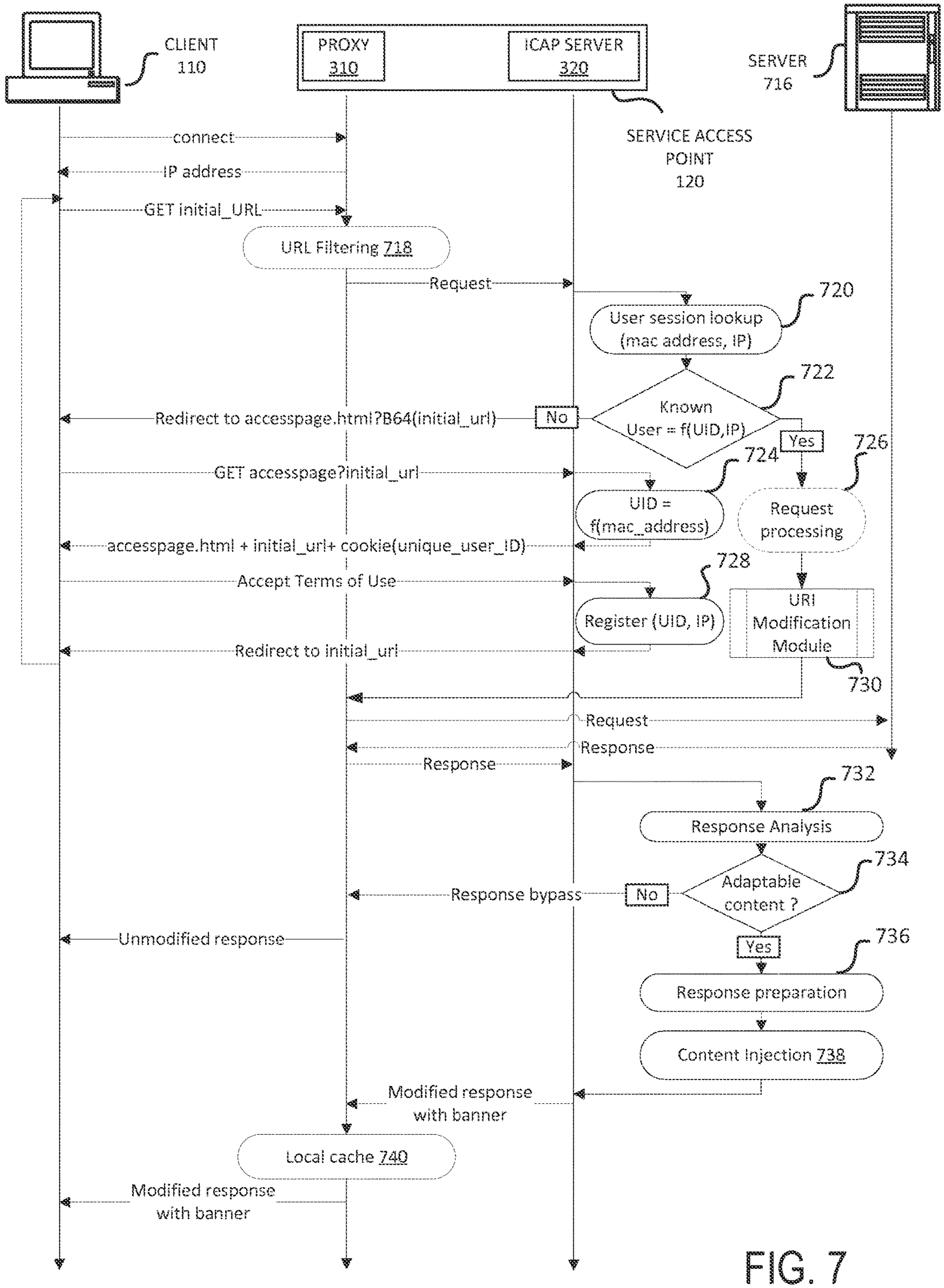
FIG. 7 is a sequence diagram illustrating user interaction with one embodiment of the invention, including proxy and ICAP server activities.

FIG. 7 is a sequence diagram illustrating client interaction with one embodiment of the invention, including proxy and ICAP server activities. Client 110 first connects to the service access point device 120, and the proxy server module 310 creates a connection, assigning an IP address lease to the client 110. The client 110 then makes an initial request for a particular webpage. At this point, the proxy server module 310 performs URI filtering 718, which examines the URI and its resolved IP address to determine if either is included in a blacklist, which represents sites that may not be accessed. If the URI is not on the blacklist, the requested URI is then forwarded to the ICAP server 320, which authenticates the user by attempting a user session lookup using the MAC and IP addresses assigned to the user's device 720.

If the user is unknown, a cookie is set on the client's browser using a unique identifier, and the client is prompted to accept a set of terms of use. In one embodiment, the unique identifier may comprise the MAC address of the client's device. If the client accepts the terms of use, a user is registered in the system 728 and another request for the originally desired webpage is issued, and the process begins again from the beginning of the diagram.

If the client is known 722 as a valid user, and thereby authenticated, the request itself may optionally be processed 726. In one embodiment, this processing step deactivates specific HTTP protocol extensions present within the request headers in order to allow for content injection. For example, this step may deactivate Google® SDCH protocol request headers. SDCH stands for "Shared Dictionary Compression over HTTP," which is an HTTP 1.1 extension for reducing redundancy across HTTP responses. In one embodiment, this deactivation process removes the "Accept-Encoding:" header from the request. In another embodiment, the deactivation process removes the "Accept-Encoding", "Avail-Dictionary:", and "X-SDCH:" request headers from the request. In another embodiment, one or more of the "Accept-Encoding", "Avail-Dictionary:", and "X-SDCH:" headers will be removed or modified.

At this stage, the request is passed to the URI modification module 730 where the URI may be modified to include additional data. In one embodiment, a partner/affiliate identifier is inserted into the URI. In an embodiment, a geolocation identifier representing the physical location of the client 110 is inserted into the URI.

The proxy server module 310 may then request the desired resource (with a possibly modified URI) from a server 716. Upon receipt of the response, the proxy server module 310 passes the response to the ICAP server 320, where response analysis 732 examines the response to determine if it is eligible for modification via content injection 734. In one embodiment, only HTML files are eligible for modification, and any other type of file (e.g., JavaScript, CSS, binary files, etc.) is not eligible for modification. If the response is not eligible for content injection, it is returned to the proxy server module 310, which then returns it, unmodified, to the requesting client 110.

If the response is eligible for content injection, content is gathered to be injected into the response. The response is first prepared for injection 736, which in one embodiment involves decompressing and decoding the response. In one embodiment, this response preparation 736 is performed by the ICAP server 320.

Next, the content is injected 738 into the response. In one embodiment, the ICAP server 320 adapts the injection procedure through the use of browser analysis. By determining what browser the client 110 is using, the server is able to adapt the injection content depending upon how the device or browser may render certain types of HTML and CSS. If, for example, a user is using a browser that does not display certain HTML elements in a desired manner, different HTML elements may be chosen for use in the injection. In one embodiment, the system analyzes the browser's reported Web user agent and modifies the injection content and/or the response to create a result that will render better in that particular browser. For example, if a Web user agent indicates that the client is using a mobile device, the injection process injects different (e.g. smaller, or differently dimensioned) pieces of content that will display better on a smaller screen. In one embodiment, the ICAP server 320 also analyzes the response webpage itself to determine the best approach for injecting content. In some embodiments, the ICAP server 320 maintains a list of certain websites that require a particular type of modification. If the response is determined to be covered by a website in this list, content injection occurs using a different custom process. Further, the ICAP server 320 may also decide not to inject content into a response webpage. In one embodiment, the decision not to inject is made based upon an analysis of the response webpage itself. In another embodiment, the decision not to inject is made by determining if the webpage belongs to a "do not inject" list. This "do not inject" list may be a list of servers, domains, subdomains, partial URIs, or individual document addresses that indicate resources that should not be modified by content injection. This "do not inject" list may be configured and maintained by a human user or software module.

The injection of content into a response creates a modified response. In one embodiment, the injected content is placed within a banner that is superimposed or overlaid on top of the page. This modified response is returned to the proxy server module 310, which is then cached within the proxy server module 310 or elsewhere inside the service access point device 120. This caching improves performance for later requests for the same content, as the proxy server can just return the cached copy to the user instead of requesting the page, modifying the page, and then returning the page. This caching can reduce the time required to serve a webpage request, reduce processor load, and reduce the number of network requests required.

Figure 8:
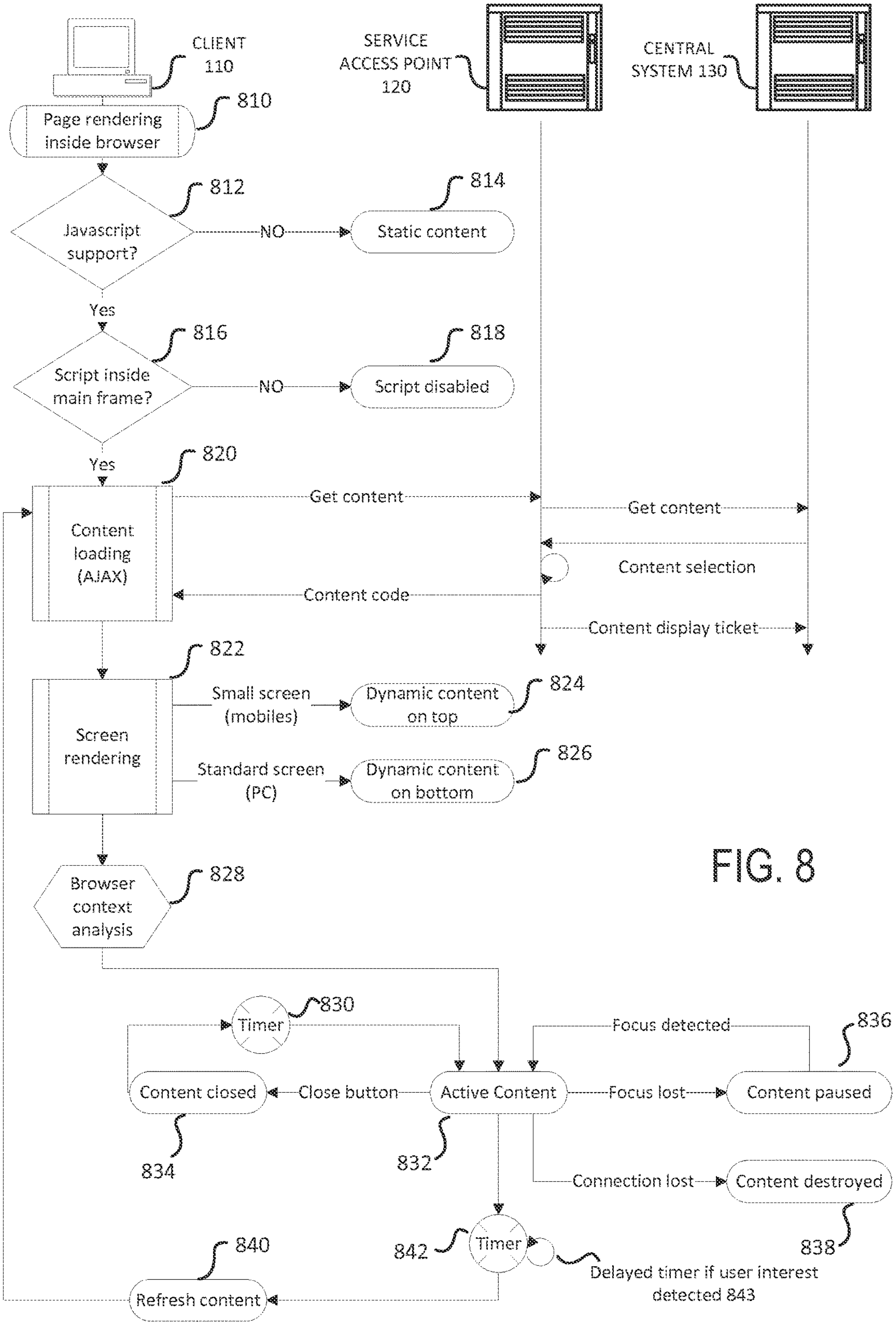
FIG. 8 is a sequence diagram illustrating the creation and display of a webpage with injected content according to one embodiment of the invention.

FIG. 8 is a sequence diagram illustrating the creation and display of a webpage with injected content according to one embodiment of the invention. The diagram begins with a client 110 having already received a modified webpage from the service access point device 120. At this stage, the client's browser has the page source and enough other necessary files (e.g. images, JavaScript files, etc.) to begin rendering the page 810. If the browser does not provide JavaScript support 812, all injected page scripts are effectively useless. In one embodiment, the already-modified webpage source includes static content within an HTML "<noscript>" tag block that browsers will render if the browser does not provide JavaScript support, so the injected content will continue to display. If there is JavaScript support provided by the browser 812, an injected script is able to detect whether it is located within the main frame of the browser 816. If it is not, the script may be disabled 818 and no injected content is displayed to the client. Otherwise, the injected content will be rendered.

In one embodiment, additional injectable content may be automatically loaded through Asynchronous JavaScript and XML (AJAX) requests 820 or other similar technologies. In this embodiment, a JavaScript script executes AJAX calls to the service access point device 120 (or another server accessible using the network 140) to request additional content. The service access point device 120 then requests content from the Content Selection Intelligence Module 410 within the central system 130. This content is returned to the service access point device 120, which forwards the content back to the client 110 browser. In an embodiment, the service access point device 120 submits a content display ticket to the data warehouse 430 within the central system 130, which allows for accurate reporting of the content shown to users. In one embodiment, this report includes the content that was displayed, the user it was displayed to, the time it was displayed, and the page it was displayed upon.

With this content received from the AJAX call, the JavaScript script within the browser will then update the rendering of the screen 822. In one embodiment, this script will analyze the browser and system configuration of the client device, and as a result will render the page content differently. For example, if the script determines that the screen size is small (i.e. the device may be a mobile device), it may choose to load dynamic content on the top of the browser window 824. Additionally, if the script determines that the screen size is standard or large (i.e. the device may be a traditional PC), it may choose to load dynamic content on the bottom of the browser window 826. Additionally, the script may choose to make any other number of modifications due to its analysis of the environment, such as loading different types of content, sizes of content, or placing the content in different locations (e.g. top, bottom, sides, middle, etc.) on the screen.

At this point, browser context analysis may be performed 828, which is now described.

In one embodiment of the invention, dynamic (i.e. "active") content is displayed on a client's device screen 832. This content may include a button allowing a user to close the content or hide it from view. If the user clicks this button, the content will be hidden 834. In one embodiment, when the content is hidden, a timer begins to run 830. After a particular amount of time—either predetermined or random—the content is made "active," and it is displayed again. In another embodiment, if the user clicks the button to hide the content and then navigates to another webpage, the content will again be displayed on the client's screen 832.

In certain embodiments, this dynamic content executes a refresh timer 842, which tracks how long the content has been displayed to the client 110. After a particular amount of time—either predetermined or random—the content is refreshed with different content 840 through one or more AJAX calls. In one embodiment of the invention, this amount of time (the refresh rate) is set for the entire page, and each piece of loaded content will remain visible for the same amount of time. In another embodiment, each piece of content has a particular refresh time associated with it. Thus, some pieces of content—perhaps deemed more important—are shown on the page longer before being replaced. Similarly, in embodiments of the invention each piece of content is also given a particular weight, where heavily-weighted content is given a higher likelihood of being chosen to be displayed during each content refresh.

Additionally, according to an embodiment, the dynamic content is able to sense whether it is within a browser window that has focus. If a window containing the content loses focus (e.g. a browser is minimized and another application is being actively used), the content will not refresh or reload 836. When focus returns to the browser window containing the injected content, the content will sense the focus and continue execution of the refresh timer.

Similarly, in an embodiment, if the dynamic content senses that a user's mouse or selector is over the dynamic content, the refresh timer is paused, thereby preventing the content from reloading because the user appears to be interested in the content. Alternatively, in another embodiment, when a user's mouse or selector is over the dynamic content, the refresh timer is reset 842. In other embodiments, the timer is either halted or reset if the mouse or selector is simply near the dynamic content.

Additionally, if the dynamic content senses that the connection to the service access point device 120 is lost, the content will be destroyed 838.

Figure 9:
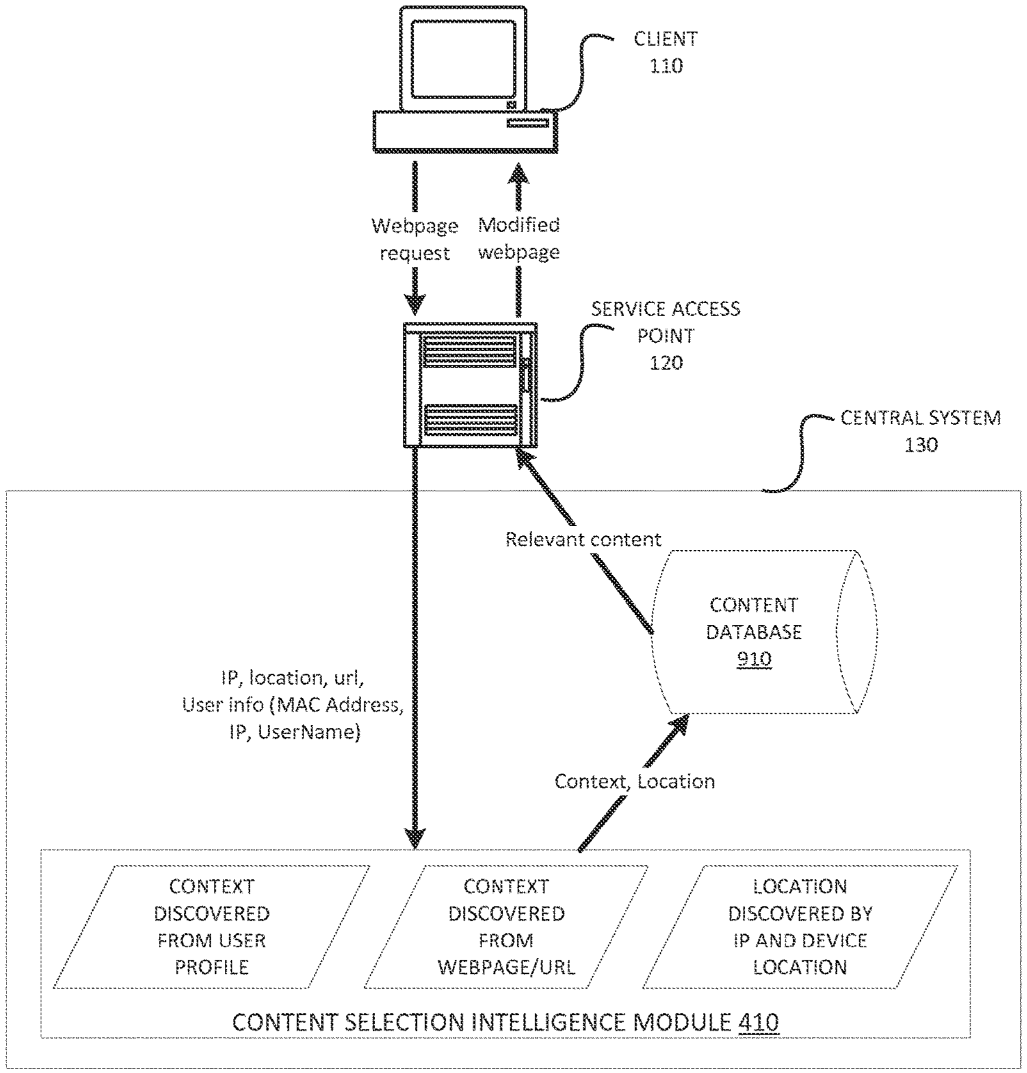
FIG. 9 is a high-level component diagram illustrating a content selection intelligence module useful for selecting injectable content in one embodiment of the invention.

FIG. 9 is a high-level component diagram illustrating a content selection intelligence module useful for selecting injectable content in one embodiment of the invention. When a client 110 makes a request for a network resource such as a webpage 150, it is sent to the service access point device 120. In servicing this request, the service access point device 120 needs to determine what content should be injected into the returned webpage. In one embodiment, the service access point device 120 sends a request for content with one or all of the following pieces of data to the central system 130: the Internet protocol (IP) address of the client, the URI requested by the client, the user's device MAC address (i.e. device identifier), the user's system username, and a unique user identifier. This information is passed on to the Content Selection Intelligence Module 410, which uses the information to assist in determining a context and location for the request.

Using the IP address and device identifier, the Content Selection Intelligence Module 410 first resolves the geolocation of the request. In one embodiment of the invention, the IP address to geolocation translation is resolved using a third party API hosted on a different server. In another embodiment, the IP address to geolocation translation is resolved using a data structure local to the central system 130. In another embodiment, the device identifier is used to query a device database to retrieve a cached geolocation of the device.

In addition to resolving a geolocation, the Content Selection Intelligence Module 410 also determines a context for the request. Using the client's requested URI, the Content Selection Intelligence Module 410 resolves the current context that the client 110 is trying to get the information about. By examining the Meta tags and body text contained within the HTML source of the web page requested by the client, the Content Selection Intelligence Module 410 extracts keywords that describe the context of the web page.

Additionally, in some embodiments the Content Selection Intelligence Module 410 determines more context information—user demographics—through the use of a user identifier to query the a user profile database to retrieve the demographics of the user such as gender, age group, hobbies, and interests.

With this geolocation and context information, which may include webpage context information and/or user demographic context information, the Content Selection Intelligence Module 410 queries a content database 910 to determine the most relevant content for the client 110 and request. In one embodiment, the most relevant content is the most profitable promotional content, where profitability is determined by calculating the amount of revenue to be earned by showing each potential piece of content to the particular user for the particular request. In another embodiment, the most relevant content is the content that most closely matches the context of the request itself. For example, if a client 110 requests a webpage 150 pertaining to sports, the most relevant content might be an advertisement related to sports, perhaps from a golf course or bowling alley. In embodiments, the context of the request is determined using a client's request history, the webpage requested itself 150, and/or the geolocation of the requesting client 110. The content database 910 may be a database residing on the same processing system, local network, or on an affiliated server, or it can be a third party database that can return relevant content when page context, user demographic, and/or current geolocation information is passed as an argument.

Once the relevant content is retrieved, it is returned back to the service access point device 120, which will inject this content into the requested webpage and return the modified webpage to the requesting client 110.

The subject matter of the content is nearly unlimited. Nearly anything that can be represented in a digital format may be injected as content using the invention disclosed herein. In embodiments of the invention, the subject matter includes one or more of local, regional, or global advertising material, content from ad networks, daily deals, content from affiliates and partners, classified ads, and a real-time messaging system.

The format of the content similarly may be varied. In various embodiments, the format is static and unchanging, dynamic and changing, interactive, a flash-style animation or game, a video, plain text, an image, audio, or a combination of more than one of the aforementioned formats.

Further, this content may have varying levels of interactivity. In various embodiments, the content is clickable to redirect users to an end site, clickable to lead to a deal site, a non-clickable static banner, clickable to direct users to classifieds, interactive to allow real-time messaging, or a combination of more than one of the aforementioned possibilities.

Figure 10:
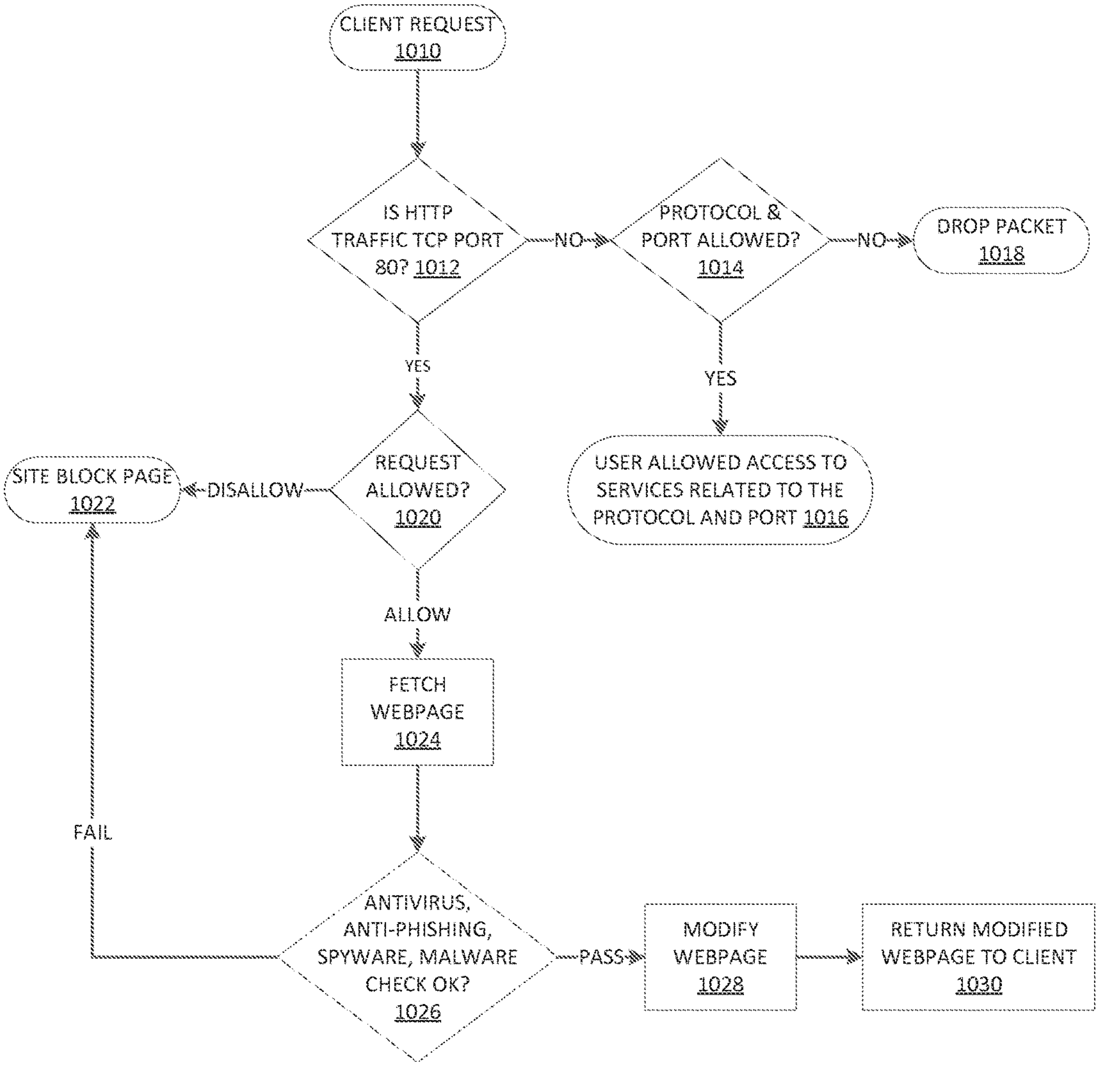
FIG. 10 is a flow diagram illustrating the use of a security module useful in one embodiment of the invention.

FIG. 10 is a flow diagram illustrating the use of a security module useful in one embodiment of the invention. The flow diagram begins with a client 110 making a request to access a resource on the network or Internet 1010, which is sent to the service access point device 120. The service access point device 120 examines both the protocol and port of the request. In one embodiment, the service access point device 120 will first determine if the request appears to be a standard HTTP request, using both port 80 and the Transmission Control Protocol (TCP) 1012. If both of these requirements are not met, the protocol and port combination is examined in the device's firewall rules 1014. If the firewall 350 is configured to allow a particular combination, then access to the service(s) is given to the client 110 and the client 110 then connects to the service(s) 1016. If the protocol and port combination is not allowed in the firewall ruleset, the request is simply dropped 1018. In one embodiment, the service access point device and firewall configuration purposefully does not intercept any traffic meant for the TCP protocol on port 443, which is commonly reserved for Hypertext Transfer Protocol Secure (HTTPS) connections.

However, if the client request was for TCP protocol and port 80, then this traffic gets redirected to the proxy server module 310. In one embodiment of the invention, this traffic is redirected to the proxy server on port 3128 or any other port set for the proxy server. The proxy server hands this request over to URI/IP filtering 1020; if the URI/IP is part of a blacklist, then the user is shown an indication that the page is blocked 1022, otherwise the request is handed over to ICAP server for content modification. Upon receipt of the requested data fetched by proxy server 1024, this response is further checked for problems such as viruses, phishing attacks, malware, spyware, fraud, etc. 1026 by a security module 311. If an indication of one or more problems is found in the response, the user is shown an indication that the page is blocked 1022. If no problems are found in the response, then the response is injected with content 1028 and transmitted back to the client 110 requesting the resource or website 1030.

Figure 11:
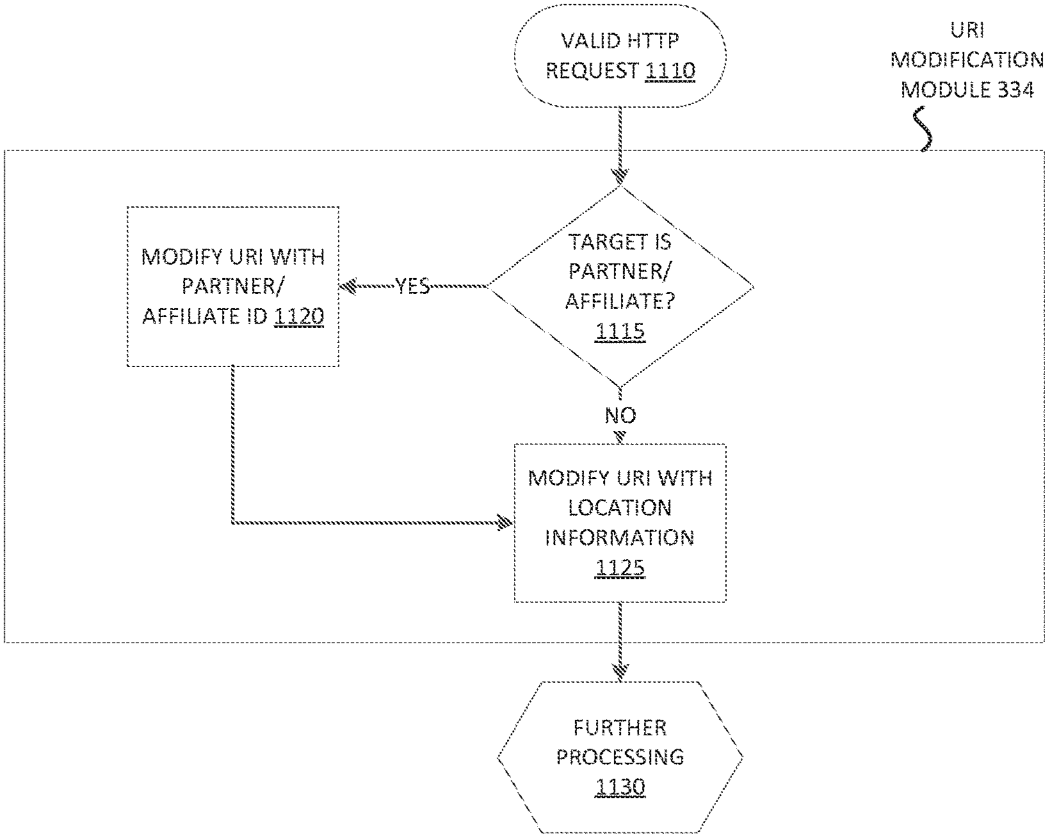
FIG. 11 is a flow diagram illustrating a URI modification module useful in one embodiment of the invention.

FIG. 11 is a flow diagram illustrating a URI modification module useful in one embodiment of the invention. The URI Modification Module 334 dynamically replaces or appends an affiliate id/partner id value in any URI that belongs to a list of defined affiliate/partner websites. All valid web page requests (e.g. HTTP traffic) 1110 coming into the service access point device 120 are validated as eligible for URI modification. After the request is validated, the URI Modification Module 334 processes the request before the web page is actually fetched from the Internet. During this processing, the URI Modification module checks if the requested web page is part of a domain belonging to a list of defined affiliates/partners 1115.

If the requested web page is part of a domain belonging to a defined affiliate/partner, the URI Modification module 334 modifies the URI 1120 by looking up a regular expression and tracking id that is mapped to the selected affiliate/partner's domain. This regular expression contains a pattern that is used to search the requested URI. If the pattern defined by the regular expression matches a pattern within the URI, the regular expression replaces the matched pattern with a particular replacement string. If the regular expression pattern is not found within the requested URI, the replacement string may also be appended to the URI.

For example, consider a situation where the requested URI was "http://www.amazon.com/product/1235?tag=xyz". If the regular expression for the domain amazon.com is "tag=.*", and the replacement string for that domain is "tag=ragapa-trackingid", the URI Modification module will generate a modified request URI that will look like "http://www.amazon.com/product/1235?tag=ragapa-trackingid" because the URI substring "tag=xyz" matches the regular expression pattern "tag=.*". In this example, the replacement string "tag=ragapa-trackingid" is provided by the affiliate amazon.com and inserted into the URI in this manner to serve as an affiliate identifier.

Similarly, consider a situation where the requested URI is "http://www.amazon.com/product/1235". If the regular expression for the domain amazon.com again is "tag=.*", and the replacement string for the domain is again "tag=ragapa-trackingid", the URI Modification module will generate the same modified request URI—"http://www.amazon.com/product/1235?tag=ragapa-trackingid". This is because the URI does not contain a substring matching the regular expression pattern "tag=.*", so the replacement string is simply appended to the end of the URI. It is readily appreciated by those of skill in the art that many other regular expressions or code segments may serve the same purpose as the "greedy" regular expression example provided above, which is not meant to be limiting but merely illustrative. In one embodiment, this URI modification will help with generating commissions based on the eventual sale of products and services on the affiliate/partner website.

If the original requested URI does not belong to the list of defined affiliates/partners, it is not modified to include a partner/affiliate identifier.

The URI Modification module 334 may also insert/append the location information of the device location into the URI 1125. In one embodiment, this information will help generate revenue by having a partnership with target websites, thereby providing these partners location information so they can similarly provide custom geolocation-related content to the end user as well.

After the request URI is modified, it is passed on to other modules for further processing 1130 if any, and then the resource identified by the modified URI is fetched from the network 140 or Internet.

Figure 12:
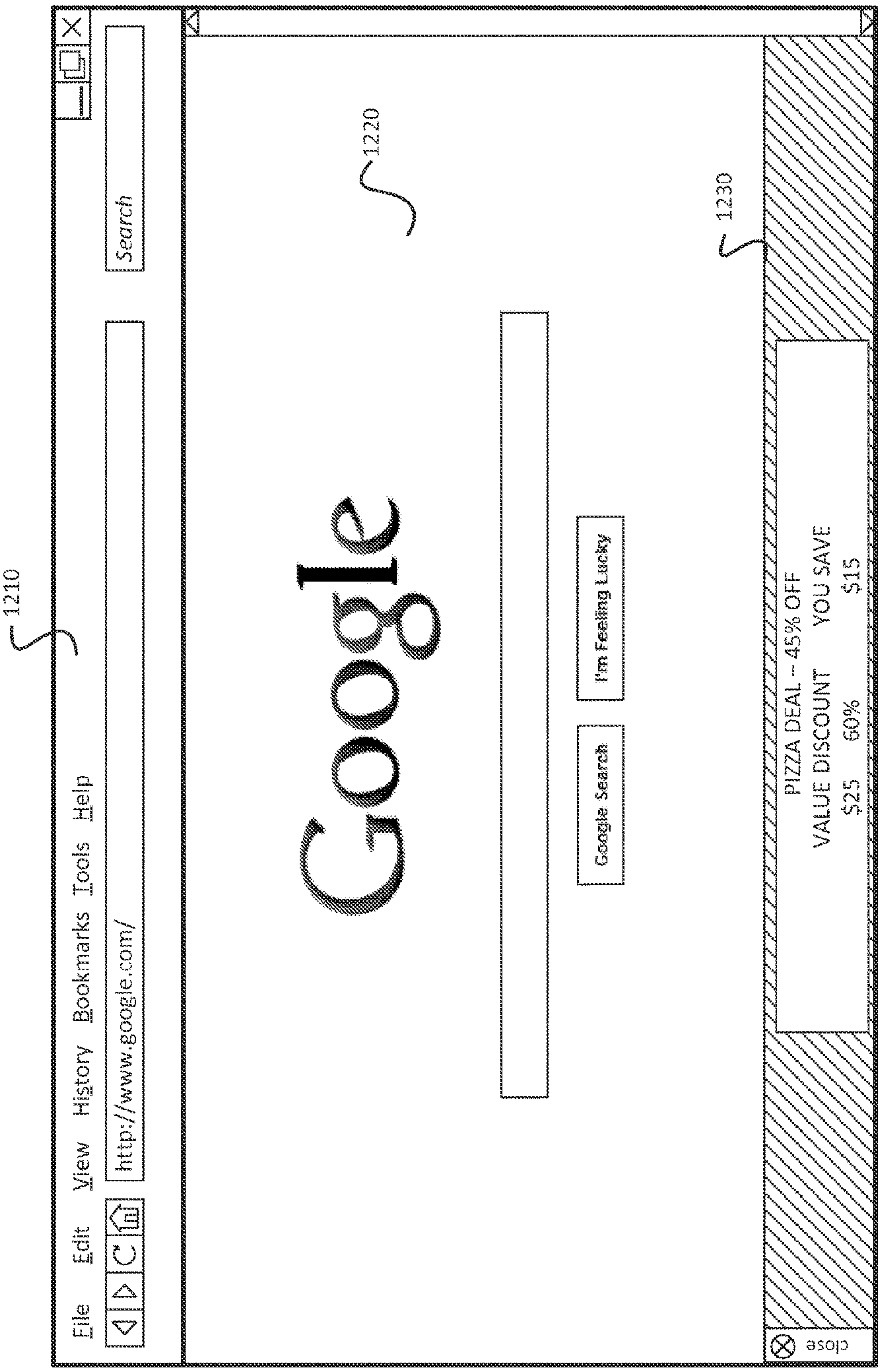
FIG. 12 is an illustration of injected content within a webpage.

FIG. 12 is an illustration of injected content within a webpage. An example browser window 1210 is depicted with a modified webpage loaded 1220. In this example, the injected content is placed at the bottom of the screen and appears as a dark bar containing an advertisement for a pizza restaurant 1230.

Figure 13:
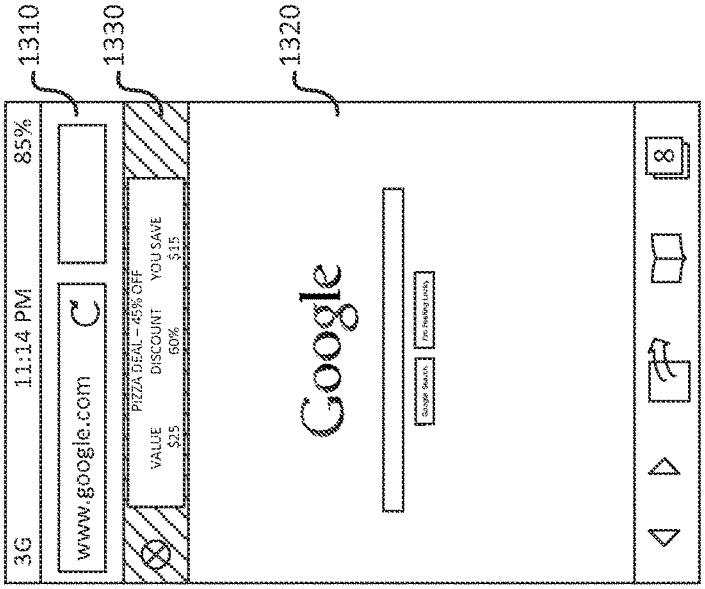
FIG. 13 is an illustration of injected content within a webpage as displayed on a mobile device.

FIG. 13 is an illustration of injected content within a webpage as displayed on a mobile device. An example browser window 1310 is depicted with a modified webpage 1320 loaded. In this example, the injected content is placed at the top of the screen and appears as a dark bar containing an advertisement for a pizza restaurant 1330. In an embodiment, the modified webpage 1320 is a webpage specifically designed for presentation on a mobile device; in other embodiments, the modified webpage 1320 is a traditional standard webpage that is not specifically designed for a mobile browser.

Figure 14:
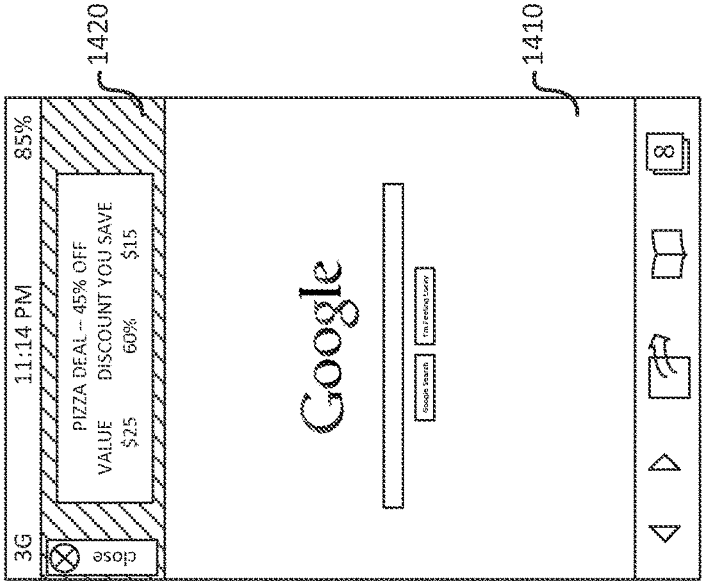
FIG. 14 is an illustration of injected content within an application as displayed on a mobile device.

FIG. 14 is an illustration of injected content within an application as displayed on a mobile device. A modified webpage is loaded 1410, and the injected content is placed at the top of the screen, which contains an advertisement for a pizza restaurant 1420.

FIG. 15 is a high-level block diagram showing an example of the hardware architecture of a processing system. This hardware architecture may be wholly or partially representative of a client 110 device, service access point device 120, or Central System 130 as illustrated in FIGS. 1-2. Certain standard and well-known components which are not germane to the present invention are not shown.

The processing system includes one or more processors 1521 coupled to a bus system 1523. The bus system 1523 is an abstraction that represents any one or more separate physical buses and/or point-to-point connections, connected by appropriate bridges, adapters and/or controllers. The bus system 1523, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (Firewire).

The processors 1521 are the central processing units (CPUs) of the processing system and, thus, control the overall operation of the processing system. In certain embodiments, the processors 1521 accomplish this by executing software stored in memory 1522. A processor 1521 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

The processing system also includes memory 1522 coupled to the bus system 1523. The memory 1522 represents any form of random access memory (RAM), read-only memory (ROM), flash memory, or a combination thereof. Memory 1522 stores, among other things, the operating system 1524 of the processing system.

Also connected to the processors 1521 through the bus system 1523 are a storage device 1526, a storage adapter 1527, and a network adapter 1528. Storage device 1526 may be or include any conventional non-transitory medium for storing data in a non-volatile manner, such as one or more disks. The storage adapter 1527 allows the processing system to access a storage subsystem and may be, for example, a Fibre Channel adapter or a SCSI adapter. The network adapter 1528 provides the processing system with the ability to communicate with remote devices over a network and may be, for example, an Ethernet (IEEE 802.3) adapter, a Fibre Channel adapter, or an 802.11 wireless adapter.

Memory 1522 and storage device 1526 store software instructions and/or data, which may include instructions and/or data used to implement the techniques introduced here.

"Hotspot 2.0" Embodiments

Aspects of the invention are also useful as part of next-generation hotspot technology. One recent initiative in this field developed by the Wireless Broadband Alliance is entitled Hotspot 2.0 (HS2.0), which provides a specification toward a tighter integration between Wi-Fi networks and cellular networks. Hotspot 2.0 relies heavily upon the IEEE 802.11u standard, which provides for interoperable, automated discovery of suitable Wi-Fi networks through pre-authorization and advertising techniques and provides eased user authentication, authorization, and provisioning.

An important aspect that the Hotspot 2.0 initiative aims to provide is a more seamless transition for users between 3G/4G cellular networks and Wi-Fi networks without requiring any user action such as network selection, or additional user sign-on or authentication (e.g., through login web pages, captive portals, splash pages). In this manner, the transition from cellular to Wi-Fi connectivity is not readily-apparent to end users. To implement this transition, among other things, modifications to Wi-Fi access points and the protocols that they use are required. Aspects of dynamic content injection and URI modification work well in such network environments.

Figure 16:
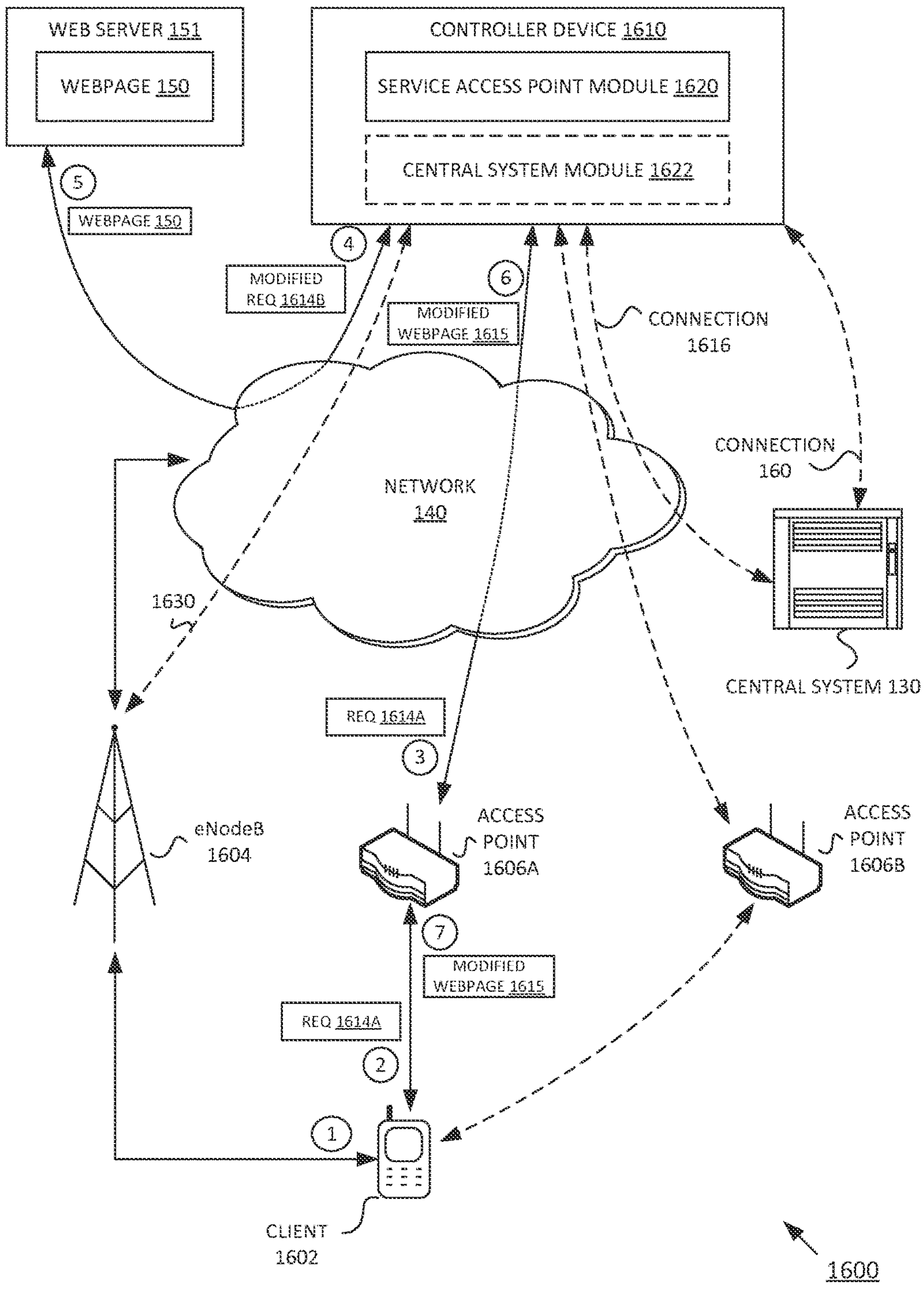
FIG. 16 illustrates an embodiment of a network environment in which the invention may be implemented.

FIG. 16 illustrates an embodiment of a network environment 1600 in which the invention may be implemented. In certain embodiments, this network environment 1600 is a Hotspot 2.0-style network and thereby operates according to that specification. In these embodiments, injected content is seamlessly displayed to users without disrupting the user experience while users switch from cellular (e.g. 3G, 4G) data network access to Wi-Fi data network access. However, the invention may also be implemented in similarly-architected network environments that are not Hotspot 2.0 compliant.

The following sequence of steps describes one possible series of events in the network environment 1600 useful to illustrate aspects of the invention in an embodiment of the invention. Of course, many other sequences may also occur in such a network environment 1600 according to the invention. At circle 1, a client 1602 connects to a network 140 using cellular communication through one or more wireless access points. In an embodiment of the invention using Long Term Evolution (LTE, or 4G LTE) wireless communication, the wireless access points are Evolved Node B (eNodeB, or eNB) interfaces (e.g. 1604), and the client 1602 is a dual-mode mobile device operable to utilize cellular and Wi-Fi communications, but in other embodiments the wireless access points and the client may be other analogous devices. In the example illustrated in FIG. 16, the client 1602 connects to the network 140 through one eNodeB 1604. For one or more of a variety of reasons, such as the client 1602 moving to a new geographic location, load balancing purposes, or for concurrent communication techniques (e.g. enabling additional bandwidth through multiple network connections, such as in multiple-input and multiple-output (MIMO) communications), the client 1602 is also able to connect to the network 140 through other eNodeB interfaces (not illustrated).

In some embodiments of the invention, requests for resources of the network 140 made through an eNodeB interface are directed 1630 through the controller device 1610 for content injection and URI modification, which is similar to the "cloud model" disclosed earlier in FIG. 2. However, it is anticipated that in many embodiments of the invention, requests for resources of the network 140 will be directed through the controller device 1610 when a client's 1602 traffic is offloaded from an eNodeB 1604 to an WiFi access point (e.g. 1606A), or when a client's 1602 traffic is shifted from one WiFi access point 1606A to another WiFi access point 1606B. The details of these embodiments are detailed below.

According to the Hotspot 2.0 specification, when a mobile device comes within communicative range of a HS2.0 enabled access point, the data connectivity of the mobile device moves from the cellular network over to the HS2.0-enabled WiFi access point seamlessly. Accordingly, in the embodiment depicted in FIG. 16, the client 1602 enters the range of a HS2.0-enabled access point 1606A and begins a connection to the network 140 through the access point 1606A. The access point 1606A will then tunnel data through a network 140 to a controller device 1610. The controller device 1610 includes a service access point module 1620, which provides the same functionalities of the service access point 120 illustrated in FIGS. 1-2 and detailed in FIG. 3, for example. The controller device 1610, in some embodiments, also contains a central system module 1622, which provides the same functionalities of the central system 130 illustrated in FIGS. 1-2 and detailed in FIG. 4, for example. In other embodiments, the central system 130 is external to the controller device 1610 and is accessible through the network 140 using connection 1616 or directly accessible using connection 160.

In the depicted embodiment, at circle 2 the client 1602 issues a request 1614A for a webpage 150 available on the network 140. The request 1614A, which includes an URI for the webpage 150, is received by the access point 1606A and sent at circle 3 to the controller device 1610. The service access point module 1620, using its URI Modification module 334 (not depicted in this figure), modifies the URI within the request 1614A to generate a modified URI, and sends a modified request 1614B including the modified URI at circle 4 through the network 140 to web server 151 to retrieve webpage 150. As described above, the URI Modification module 334 is able to modify a URI by replacing or inserting one or more of an affiliate identifier or partner identifier value in any URI that belongs to a list of defined affiliate or partner websites. Additionally, in some embodiments, the URI modification module 334 inserts location data into the URI of the request 1614A to provide additional information to the server hosting the requested webpage 150 about the physical geolocation of the client 1602. At circle 5, the webpage 150 is sent by the web server 151 through the network 140 and is received by the controller device 1610 from the network 140.

Similar to embodiments described earlier, in the depicted embodiment of FIG. 16 the service access point module 1620 modifies the webpage 150 by injecting content to create a modified webpage 1615, which is sent back to the access point 1606A at circle 6, and ultimately sent back to the client 1602 at circle 7. The service access point module 1620, in some embodiments, utilizes the central system module 1622, which performs the same functionalities of the central system 130 described earlier herein, to perform aspects of the injection process.

In some embodiments, instead of the passing the request 1614A and the modified webpage 1615 through access point 1606A, this process may similarly occur through another access point 1606B or through eNodeB 1604.

In an embodiment of the invention, a requested network resource (such as webpage 150) is only modified with injected content when the client 1602 first connects through a different network entry point. For example, if the client 1602 is exclusively utilizing the eNodeB 1604 for network 140 connectivity and then begins the use of access point 1606A for network 140 connectivity, only the first injectable network resource requested by the client 1602 is modified, and subsequent network resource requests by the client 1602 during the communication session are returned unmodified. Similarly, in embodiments of the invention, when the client is exclusively utilizing access point 1606A for network 140 connectivity and then begins the use of access point 1606B for network 140 connectivity, only the first injectable network resource requested by the client 1602 is modified, and subsequent network resource requests by the client 1602 during the communication session are returned unmodified. In this manner, in some embodiments the client 1602 receives modified network resources every time network 140 connectivity occurs through a different entry point, whether it be a hop from one Wi-Fi access point to another or whether it is from a cellular connection (e.g. 3G/4G) to a Wi-Fi access point. In other embodiments, the modification occurs for every compatible requested network resource made, and in other embodiments the modification occurs at certain intervals (e.g. intervals of time, intervals of number of requests made by the client 1602, etc.). In an embodiment, the modification occurs for every compatible requested network resource.

In practice, the techniques disclosed herein may constitute one or more programs made up of computer-executable instructions. The computer-executable instructions may be written in a computer programming language, e.g., software, or may be embodied in firmware logic or in hardware circuitry. A "computer-readable storage medium," or a "non-transitory computer-readable storage medium," as the terms may be used herein, include any mechanism that provides (i.e., stores and/or transmits) information in a form accessible by a machine (e.g., a computer, network device, personal digital assistant (PDA), manufacturing tool, any device with a set of one or more processors, etc.). A "non-transitory computer-readable storage medium," as the term is used herein, does not include a signal, carrier wave, etc. The term RAM as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into RAM/memory during execution of software by a processor. One of skill in the art will immediately recognize that the terms "machine-readable storage medium" and "computer-readable storage medium" include any type of volatile or non-volatile storage device that is accessible by a processor. For example, a machine-readable storage medium includes recordable/non-recordable media (e.g., read-only memory (ROM); random access memory (RAM); magnetic disk storage media; optical storage media; flash memory devices; etc.).

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Embodiments may include various steps as set forth above. The steps may be embodied in machine-executable instructions which cause a general purpose or special-purpose processor to perform certain steps. Various elements which are not relevant to these underlying principles such as computer memory, hard drive, and input devices have been left out of some or all of the figures to avoid obscuring the pertinent aspects.

Therefore, it is expressly intended that this invention be limited only by the following claims and equivalents thereof.

What is claimed is:

1. A method for providing interactive content to a client device, the method comprising:

receiving, at a network device, a first request from the client device for a webpage accessible through a data network, the first request including a Uniform Resource Identifier (URI) of the webpage;

transmitting, by the network device over the data network, a second request for the webpage using the URI;

receiving, by the network device, the webpage;

determining the webpage is eligible for modification by determining that the webpage is of a hyper text markup language (HTML) file type, wherein no other webpage file type is eligible for modification;

responsive to determining that the webpage is eligible for modification based solely on the webpage being of the HTML file type, retrieving a script to be injected into the webpage based upon a type of the web browser or the client device, wherein the script to be executed by a web browser of the client device that causes the web browser to display the interactive content, modifying the webpage to yield a modified webpage that includes the script, and transmitting, to the client device, the modified webpage;

receiving a request generated by the script of the modified webpage on the client device for interactive content; and providing the interactive content, wherein the interactive content is to determine when user focus of the interactive content has been lost and halt refresh of the interactive content.

2. The method of claim 1, wherein the script is a JavaScript script.

3. The method of claim 2, wherein the script comprises one or more AJAX (Asynchronous JavaScript and XML) calls.

4. The method of claim 3, wherein the one or more AJAX calls cause the web browser to request the interactive content.

5. The method of claim 1, wherein the interactive content is displayed at or adjacent to the bottom of the web browser.

6. The method of claim 1, wherein the interactive content comprises a button that, when selected by a user of the client device, hides the interactive content so that the webpage is displayed without the interactive content.

7. The method of claim 1, wherein at least some of the interactive content is based upon a geographic location of the client device.

8. The method of claim 1, further comprising recording, by the network device, a Media Access Control (MAC) address of the client device, an Internet Protocol (IP) address used by the client device, or a cookie provided by the client device.

9. The method of claim 1, wherein the second request includes fewer HyperText Transfer Protocol (HTTP) headers than the first request.

10. The method of claim 1, further comprising determining the type of the web browser based upon a Web user agent of the first request.

11. A network device, which is to be coupled between a data network and a set of one or more client devices, to act as a gateway of a venue to the data network for the set of client devices and provide interactive content to the set of client devices, the network device comprising:

a network adapter configured to, receive a first set of one or more requests from the set of client devices for one or more webpages, transmit a second set of one or more requests for the one or more webpages, and receive the one or more webpages through the data network; and a content modification module coupled to the network adapter and configured to, determine whether each of the one or more webpages is eligible for modification by determining that the webpage is of a hyper text markup language (HTML) file type, wherein no other webpage file type is eligible for modification, and for each of the one or more webpages that are determined eligible for modification based solely on the webpage being of the HTML file type, retrieve a script to be injected into the webpage, wherein the script includes a script to be executed by a web browser of the respective client device that causes the web browser to display the interactive content, modify the webpage to yield a modified webpage that includes the script, and cause the network adapter to transmit each modified webpage to the respective client device that requested the respective webpage, wherein the interactive content is to determine when user focus of the interactive content has been lost and halt refresh of the interactive content via the network adapter.

12. The network device of claim 11, wherein the script is a JavaScript script.

13. The network device of claim 12, wherein the script comprises one or more AJAX (Asynchronous JavaScript and XML) calls.

14. The network device of claim 13, wherein the one or more AJAX calls cause the one or more web browsers to request the interactive content.

15. The network device of claim 11, wherein the interactive content is displayed at or adjacent to the bottom of the one or more web browsers.

16. The network device of claim 11, wherein the interactive content comprises a button that, when selected by a user of the respective client device, hides the interactive content so that the respective webpage is displayed without the interactive content.

17. A non-transitory computer-readable storage medium storing instructions that, when executed by a processor of a network device acting as a gateway for a venue and that is communicatively coupled between a client device and a data network, cause the network device to provide interactive content to the client device by performing operations comprising:

receiving, at the network device, a first request from the client device for a webpage accessible through the data network, the first request including a Uniform Resource Identifier (URI) of the webpage;

transmitting, by the network device over the data network, a second request for the webpage using the URI;

receiving, by the network device, the webpage;

determining the webpage is eligible for modification by determining that the webpage is of a hyper text markup language (HTML) file type, wherein no other webpage file type is eligible for modification; and responsive to determining that the webpage is eligible for modification based solely on the webpage being of the HTML file type, retrieving a script to be injected into the webpage, wherein the script to be executed by a web browser of the client device that causes the web browser to display the interactive content, modifying the webpage to yield a modified webpage that includes the script, transmitting, to the client device, the modified webpage; and providing the interactive content, wherein the interactive content is to determine when user focus of the interactive content has been lost and halt refresh of the interactive content.

18. The non-transitory computer-readable storage medium of claim 17, wherein the script is a JavaScript script.

19. The non-transitory computer-readable storage medium of claim 17, wherein the script comprises one or more AJAX (Asynchronous JavaScript and XML) calls that cause the web browser to request at least some of the interactive content.

20. The method of claim 1, wherein the determining the webpage is eligible for modification further comprises:

determining that the webpage does not belong to a do not inject list.

21. The method of claim 20, wherein do not inject list is a list of at least one or more servers, domains, subdomains, partial URIs, and individual document addresses.

22. The method of claim 1, further comprising:

tracking and reporting script displayed to the client device, which client device displayed the script, and what time the content was displayed.

23. The method of claim 1, further comprising:

analyzing a browser of the client device by the script of the modified webpage to determine a rendering of the interactive content.

24. The method of claim 1, wherein the interactive content is superimposed on the webpage.

* * * * *